United States Patent
Ostrowski et al.

(10) Patent No.: US 9,792,050 B2
(45) Date of Patent: Oct. 17, 2017

(54) DISTRIBUTED CACHING SYSTEMS AND METHODS

(71) Applicant: PernixData, Inc., San Jose, CA (US)

(72) Inventors: Michal Ostrowski, Cedar Park, TX (US); Akhilesh Joshi, Sunnyvale, CA (US); Deepak Muley, Santa Clara, CA (US); Satyam Vaghani, San Jose, CA (US); Bryan Jeffrey Crowe, Santa Clara, CA (US); Shyan-Ming Perng, Campbell, CA (US)

(73) Assignee: PernixData, Inc., San Jose, CA (US)

( * ) Notice: Subject to any disclaimer, the term of this patent is extended or adjusted under 35 U.S.C. 154(b) by 62 days.

(21) Appl. No.: 14/825,889

(22) Filed: Aug. 13, 2015

(65) Prior Publication Data

US 2016/0048450 A1 Feb. 18, 2016

Related U.S. Application Data

(60) Provisional application No. 62/037,010, filed on Aug. 13, 2014.

(51) Int. Cl.
| | |
|---|---|
| G06F 11/00 | (2006.01) |
| G06F 3/06 | (2006.01) |
| G06F 11/20 | (2006.01) |
| G06F 11/16 | (2006.01) |
| G06F 12/0804 | (2016.01) |

(Continued)

(52) U.S. Cl.
CPC .......... *G06F 3/0611* (2013.01); *G06F 3/0613* (2013.01); *G06F 3/0655* (2013.01); *G06F 3/0688* (2013.01); *G06F 11/1666* (2013.01); *G06F 11/2082* (2013.01); *G06F 11/2094* (2013.01); *G06F 12/0804* (2013.01); *G06F 12/0815* (2013.01); *G06F 12/0868* (2013.01); *H04L 41/0813* (2013.01); *H04L 43/065* (2013.01); *H04L 43/0817* (2013.01); *H04L 67/288* (2013.01); *H04L 67/2842* (2013.01); *G06F 9/46* (2013.01); *G06F 2201/885* (2013.01); *G06F 2212/1032* (2013.01); *G06F 2212/222* (2013.01); *G06F 2212/6012* (2013.01); *G06F 2212/657* (2013.01); *H04L 41/22* (2013.01)

(58) Field of Classification Search
CPC ............ G06F 11/1666; G06F 11/2082; G06F 11/2094
See application file for complete search history.

(56) References Cited

U.S. PATENT DOCUMENTS

| | | | |
|---|---|---|---|
| 6,571,324 B1 * | 5/2003 | Elkington | G11C 29/74 711/120 |
| 6,725,342 B1 * | 4/2004 | Coulson | G06F 12/0804 711/135 |

(Continued)

*Primary Examiner* — Charles Ehne
(74) *Attorney, Agent, or Firm* — Gard & Kaslow LLP

(57) ABSTRACT

Example distributed caching systems and methods are described. In one implementation, a system has multiple host systems, each of which includes a cache resource that is accessed by one or more consumers. A management server is coupled to the multiple host systems and presents available cache resources and resources associated with available host systems to a user. The management server receives a user selection of at least one available cache resource and at least one host system. The selected host system is then configured to share the selected cache resource.

20 Claims, 30 Drawing Sheets

(51) Int. Cl.
G06F 12/0815 (2016.01)
H04L 12/24 (2006.01)
H04L 29/08 (2006.01)
H04L 12/26 (2006.01)
G06F 12/0868 (2016.01)
G06F 9/46 (2006.01)

(56) References Cited

U.S. PATENT DOCUMENTS

| | | | | |
|---|---|---|---|---|
| 8,560,775 B1* | 10/2013 | McDuffee | ............ | G06F 3/0614 |
| | | | | 711/114 |
| 2004/0088481 A1* | 5/2004 | Garney | ............... | G06F 12/0866 |
| | | | | 711/113 |
| 2013/0097458 A1* | 4/2013 | Sekino | ................ | G06F 11/1441 |
| | | | | 714/6.3 |
| 2015/0135003 A1* | 5/2015 | Cota-Robles | ....... | G06F 11/1666 |
| | | | | 714/6.3 |

* cited by examiner

DISTRIBUTED CACHING SYSTEMS AND METHODS

CROSS REFERENCE TO RELATED APPLICATIONS

This application claims the benefit of U.S. Provisional Application Ser. No. 62/037,010, entitled "Distributed Caching Systems and Methods," filed Aug. 13, 2014. This application is also related to U.S. application Ser. No. 14/825,848, filed Aug. 13, 2015 and U.S. application Ser. No. 14/825,927, filed Aug. 13, 2015. All applications are incorporated herein by reference for all purposes.

TECHNICAL FIELD

The present disclosure relates to systems and methods that distribute cache resources across multiple host computing systems.

BACKGROUND

Existing computing systems use cache resources to improve system performance. Typically, each cache is associated with a specific computing system. In computing environments with multiple computing systems (and multiple associated caches), some caches are not utilized (e.g., when the associated computing system is not active) while other caches are operating at maximum capacity due to an active computing system using the cache. This situation results in an inefficient usage of available cache resources and reduces the overall performance of the computing environment. For example, in virtual environments, virtual machines typically move between different computing systems, which invalidates the virtual machine's previous cache.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
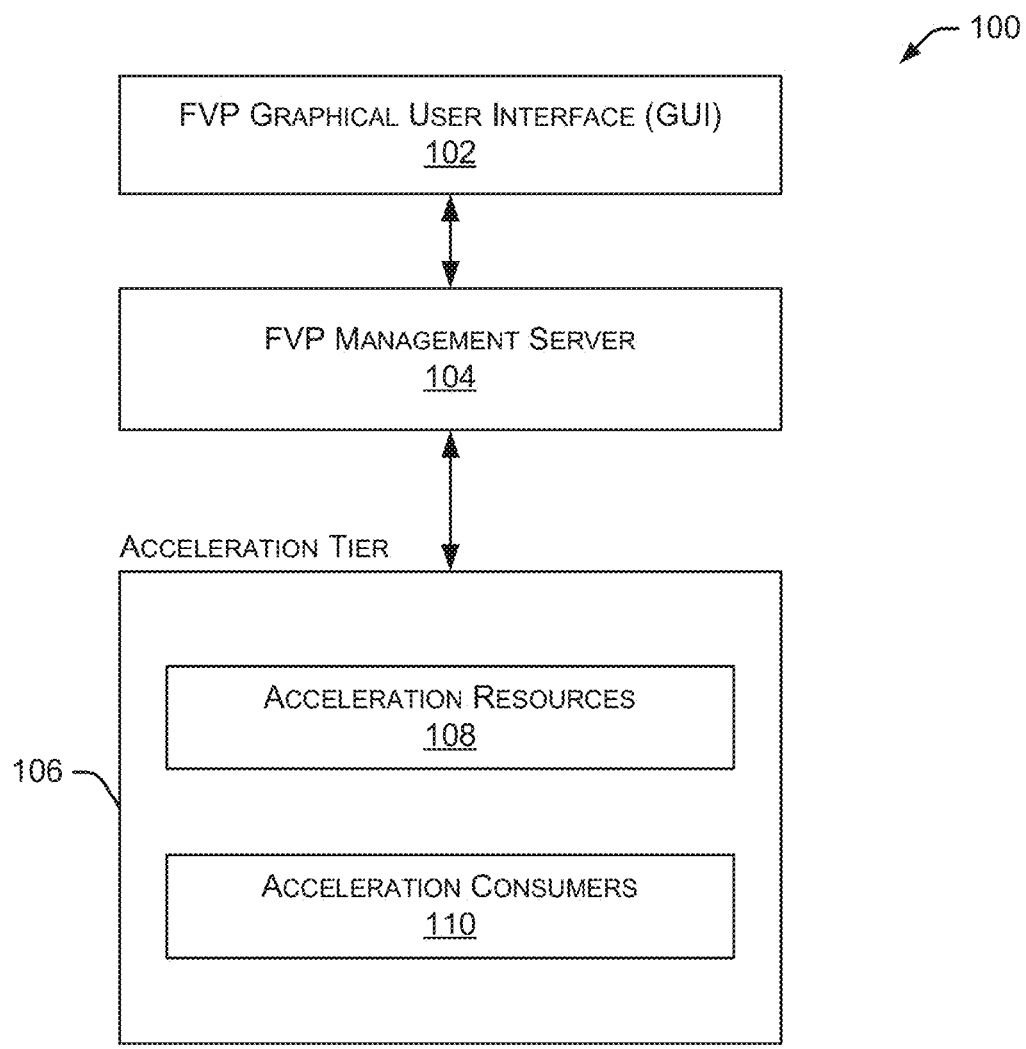
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein distribute cache resources across multiple computer systems. In some embodiments, these systems and methods virtualize cache resources (such as Flash and RAM (Random Access Memory) devices) across multiple computer systems to create a clustered pool of high-speed cache resources, which accelerate data read and write operations to shared storage systems. In particular embodiments, the cache resources include one or more RAM devices. Thus, each computer system may access multiple cache resources in any number of other computer systems, rather than being limited to the cache resources within the particular computer system. As discussed herein, a user can configure any cache resource to be shared by any number of computer systems.

Although specific examples discussed herein refer to computer systems that support multiple virtual machines, and acceleration tiers (also referred to as FVP clusters) that contain multiple computer systems, alternate embodiments may use any type of computing architecture, components, and algorithms to implement the systems and methods described herein. Further, the described systems and methods are applicable to the acceleration of any type of storage device, such as flash memory, hard drives, solid state drives, and any other memory or data storage device.

FIG. 1 is a block diagram depicting an environment 100 within which an example embodiment may be implemented. Environment 100 includes a FVP graphical user interface (GUI) 102, which allows users to interact with a FVP management server 104, for example, to configure the operation of various components and processes in an acceleration tier 106. Acceleration tier 106 may also be referred to as a FVP cluster. Acceleration tier 106 includes any number of acceleration resources 108 and any number of acceleration consumers 110. Acceleration resources 108 include systems and methods that accelerate, for example, the processing of data. Acceleration consumers 110 include systems and methods that benefit from, for example, the accelerated processing of data. Additional details regarding acceleration resources 108 and acceleration consumers 110 are discussed herein.

Figure 2:
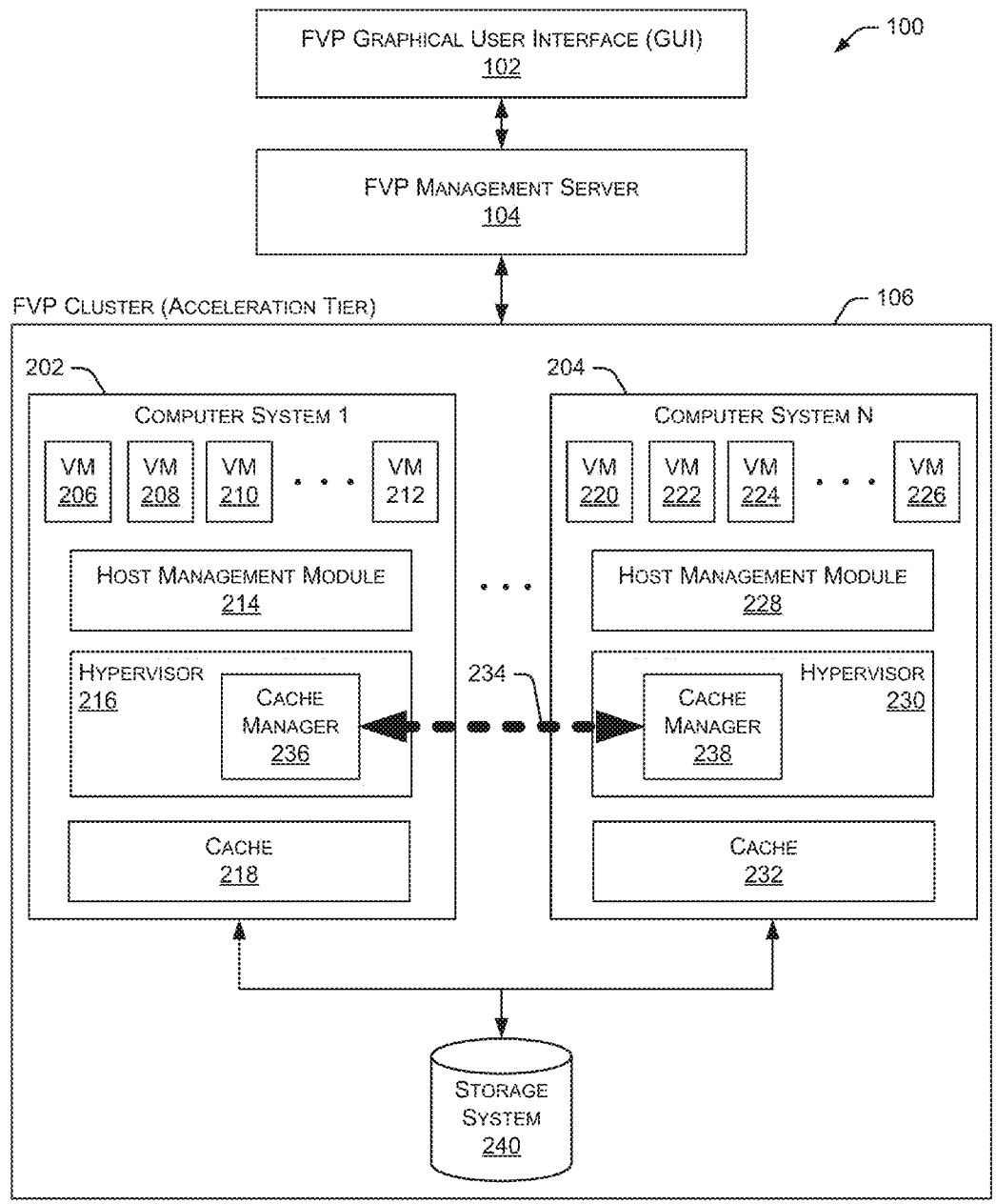
FIG. 2 is a flow diagram depicting additional details regarding the environment within which an example embodiment may be implemented.

FIG. 2 is a flow diagram depicting additional details regarding environment 100 within which an example embodiment may be implemented. As shown in FIG. 2, FVP cluster (also referred to as an acceleration tier) 106 includes any number of computer systems 202 and 204 coupled to a storage system 240. Storage system 240 may represent any type of data storage architecture and may include any number of physical storage devices. In some embodiments, storage system 240 is implemented as a storage area network (SAN). In other embodiments, storage system 240 includes a local disk, a network file system (NFS), a network attached storage (NAS), and an object store. As discussed herein, a storage system may be referred to generally as a "datastore."

Each computer system 202, 204 implements multiple virtual machines (VMs). As shown in FIG. 2, computer system 202 implements VMs 206, 208, 210, and 212, while computer system 204 implements VMs 220, 222, 224, and 226. Computer system 202 also includes a host management module 214, a hypervisor 216, and a cache 218. As discussed herein, cache 218 may be shared by any number of computer systems in FVP cluster 106. Host management module 214 communicates with FVP management server 104 to receive instructions for sharing cache 218 with other computer systems in FVP cluster 106. Hypervisor 216 contains a cache manager 236 that manages data in cache 218 with respect to the VM IO stream as observed via hypervisor 216. Cache manager 236 functions to create a clustered, distributed cache of storage acceleration resources. As shown in the embodiment of FIG. 2, hypervisor 216 includes the cache manager 236 and hypervisor 230 includes a similar cache manager 238. Cache managers 236 and 238 support, for example, various distributed caching operations discussed herein. Cache 218 caches data within a local memory (also referred to as a "cache memory"), such as Flash memory or RAM.

When an application executing on one of the VMs 206-212 generates a data read or a data write operation, the application sends the operation to host management module 214. In some embodiments, the data read or data write operation specifies a location in storage system 240. For example, with a data read operation, the FVP cluster checks the local cache (e.g., cache 236 or 238) to see if the data is cached. If the data is cached, the requested data is read from the local cache without requiring any communication with storage system 240. If the data is not cached, the requested data is retrieved from storage system 240 and writes the data to the cache for future reference. For data write operations, the IOs are sent directly to the local cache and the operation is acknowledged to the appropriate VM. Asynchronously, at a later time, the write IO is written to storage system 240 for long-term storage. In some embodiments, cache 218 caches the data record and the specified storage location. As discussed in greater detail herein, in a WriteBack cache, the generated data write operations are subsequently sent to storage system 240.

Computer system 204 includes a host management module 228 that is similar to host management module 214, a hypervisor 230 that is similar to hypervisor 216, and a cache 232 that is similar to cache 218. A communication link 234 indicates a logical connection between cache managers 236 and 238. Communication link 234 allows all cache managers in FVP cluster 106 to communicate with one another. This communication includes information related to the sharing of cache resources among all of the computer systems in FVP cluster 106. Communication link 234 may also be thought of as a software layer that allows multiple cache managers to communicate with one another.

Figure 3:
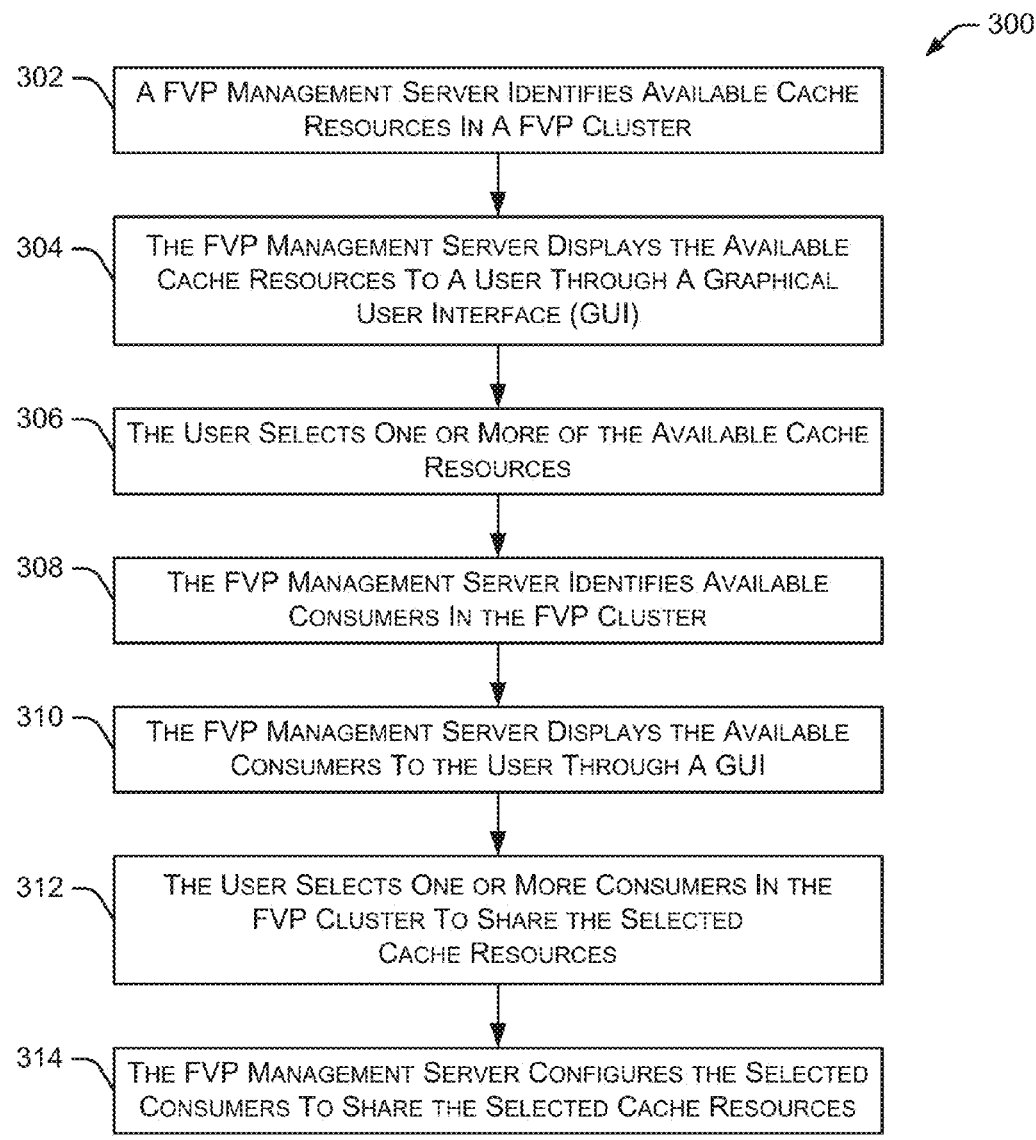
FIG. 3 is a flow diagram depicting an embodiment of a method for managing shared cache resources.

FIG. 3 is a flow diagram depicting an embodiment of a method 300 for managing shared cache resources. Initially, a FVP management server identifies available cache resources in a FVP cluster at 302. The identified cache resources include, for example, available cache resources in the multiple computer systems within the FVP cluster. The FVP management server displays the available cache resources to a user through a GUI at 304, such as GUI 102 in FIG. 1. The user selects one or more of the available cache resources at 306. The FVP management server then identifies available consumers in the FVP cluster at 308 and displays the available consumers to the user through a GUI at 310. The user selects one or more consumers in the FVP cluster to share the selected cache resources at 312. Finally, the FVP management server configures the selected consumers to share the selected cache resources at 314.

In some embodiments, method 300 further includes asking the user whether to configure the selected consumers (VMs) with WriteThrough policy or WriteBack policy. If a consumer (VM) is configured with WriteBack policy, then the FVP management server identifies backup caches located in computer systems that are different from the computer system on which the VM resides. For example, if a particular cache resource is selected as a WriteBack cache, then one or more backup caches are identified such that the backup caches are located in computer systems (referred to as "peers") that are different from the computer system on which the particular cache resides. Thus, the user selects a desired level of redundancy, then the systems and methods described herein automatically perform the operations necessary to implement the desired level of redundancy. As used herein, a peer is a host (e.g., any computer system) that contains acceleration resources used by another host to store backup copies of WriteBack data. In some embodiments, the backup caches are selected automatically (e.g., by the FVP management server or a component within a computer system). In other embodiments, the backup caches are selected by the user after being presented with a listing of available backup caches.

Figure 4:
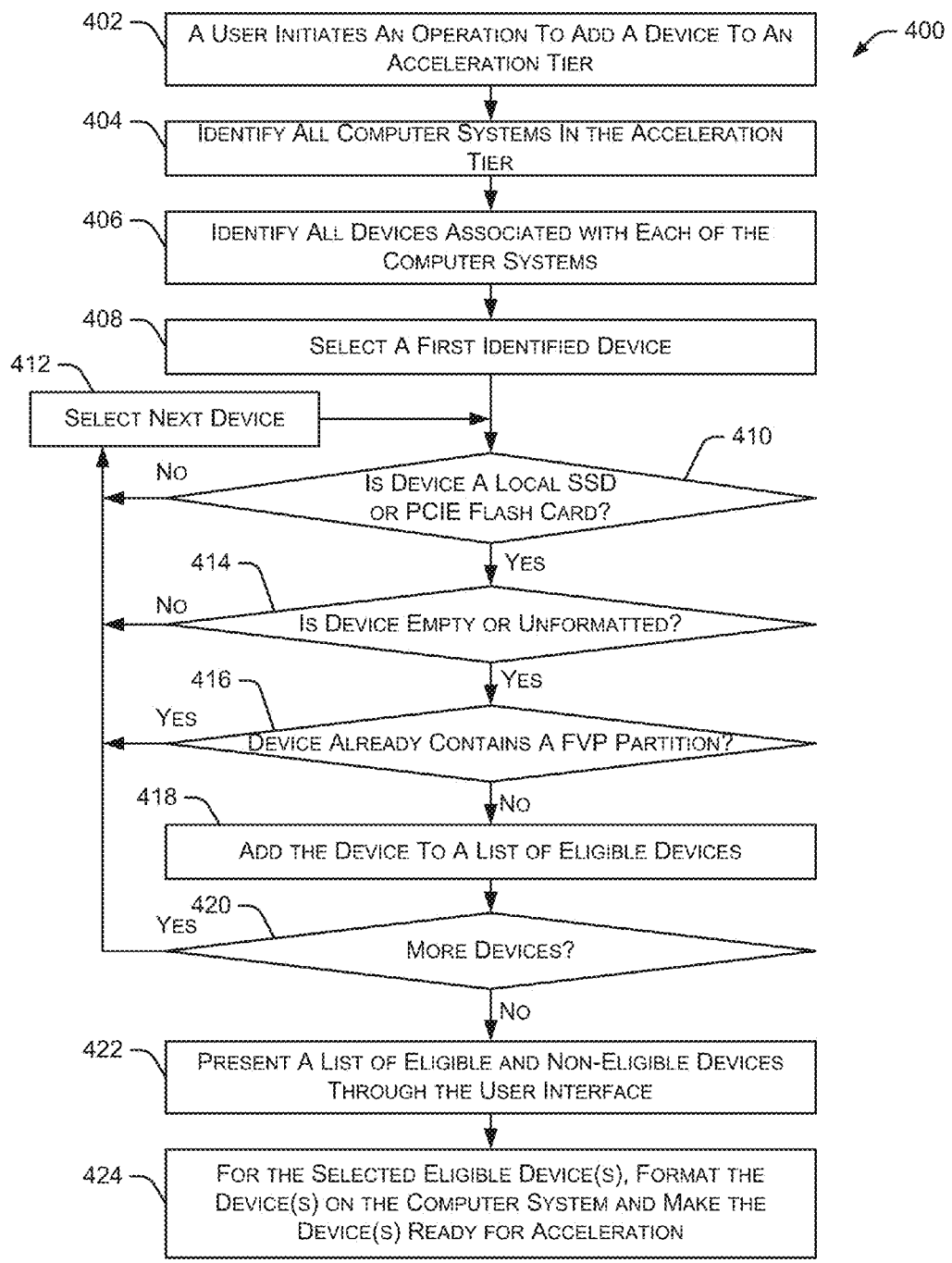
FIG. 4 is a flow diagram depicting an embodiment of a method for adding a device to an acceleration tier.

FIG. 4 is a flow diagram depicting an embodiment of a method 400 for adding a device to an acceleration tier. Method 400 begins as a user initiates an operation to add a device to an acceleration tier at 402. Method 400 identifies all computer systems in the acceleration tier at 404 and identifies all devices associated with each of those computer systems at 406. A first device is selected at 408 and method 400 determines whether the device is a local SSD or PCIE flash card (or some other device, such as RAM) at 410. If the device is not a local SSD or PCIE flash card, method 400 selects the next device at 412.

If the device is a local SSD or PCIE flash card, method 400 determines whether the device is empty or unformatted at 414. If the device is neither empty nor unformatted, the next device is selected at 412. If the device is empty or unformatted, the method determines whether the device already contains a FVP partition at 414. If a FVP partition is detected, the next device is selected at 412. If no FVP partition is detected, the device is added to a list of eligible devices at 418. If additional devices remain to be analyzed at 420, method 400 returns to 412 to select the next device. After all devices are analyzed, method 400 presents a list of eligible and non-eligible devices at 422 to the user via the user interface. For the selected eligible device(s), method 400 formats the eligible device(s) on the computer system and makes the device(s) ready for acceleration at 424.

Figure 5:
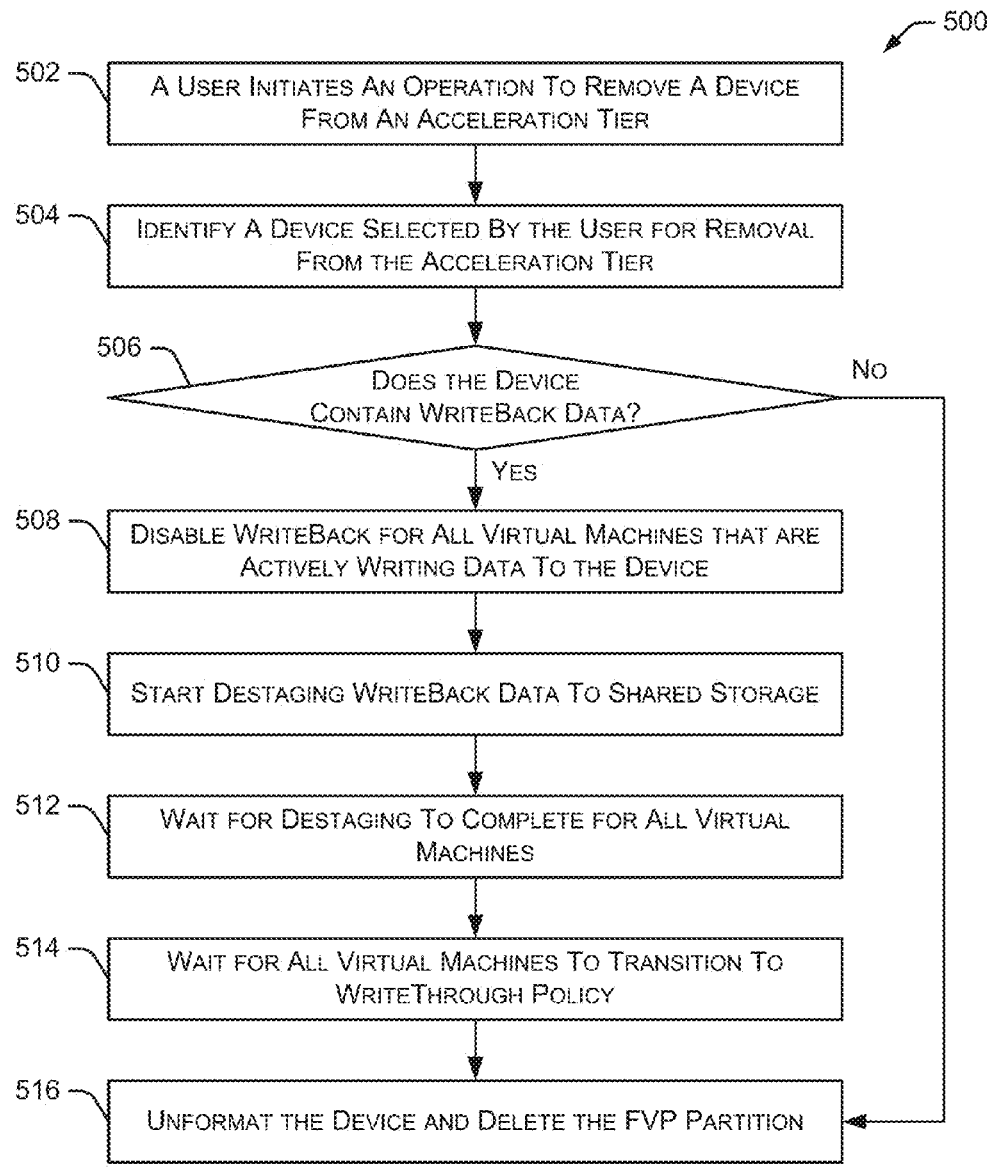
FIG. 5 is a flow diagram depicting an embodiment of a method for removing a device from an acceleration tier.

FIG. 5 is a flow diagram depicting an embodiment of a method 500 for removing a device from an acceleration tier. Method 500 begins as a user initiates an operation to remove a device from an acceleration tier at 502. The method also identifies a device selected by the user for removal from the acceleration tier at 504. Method 500 continues by determining whether the device contains WriteBack data at 506. If the device does not contain WriteBack data, the device is unformatted and the FVP partition is deleted at 516.

However, if the device contains WriteBack data, method 500 disables WriteBack for all virtual machines that are actively writing data to the device at 508. Method 500 starts destaging WriteBack data to the shared storage at 510 and waits for destaging to complete for all virtual machines at 512. Method 500 also waits for all virtual machines to transition to WriteThrough policy at 514, then unformats the device and deletes the FVP partition at 516.

Figure 6A:
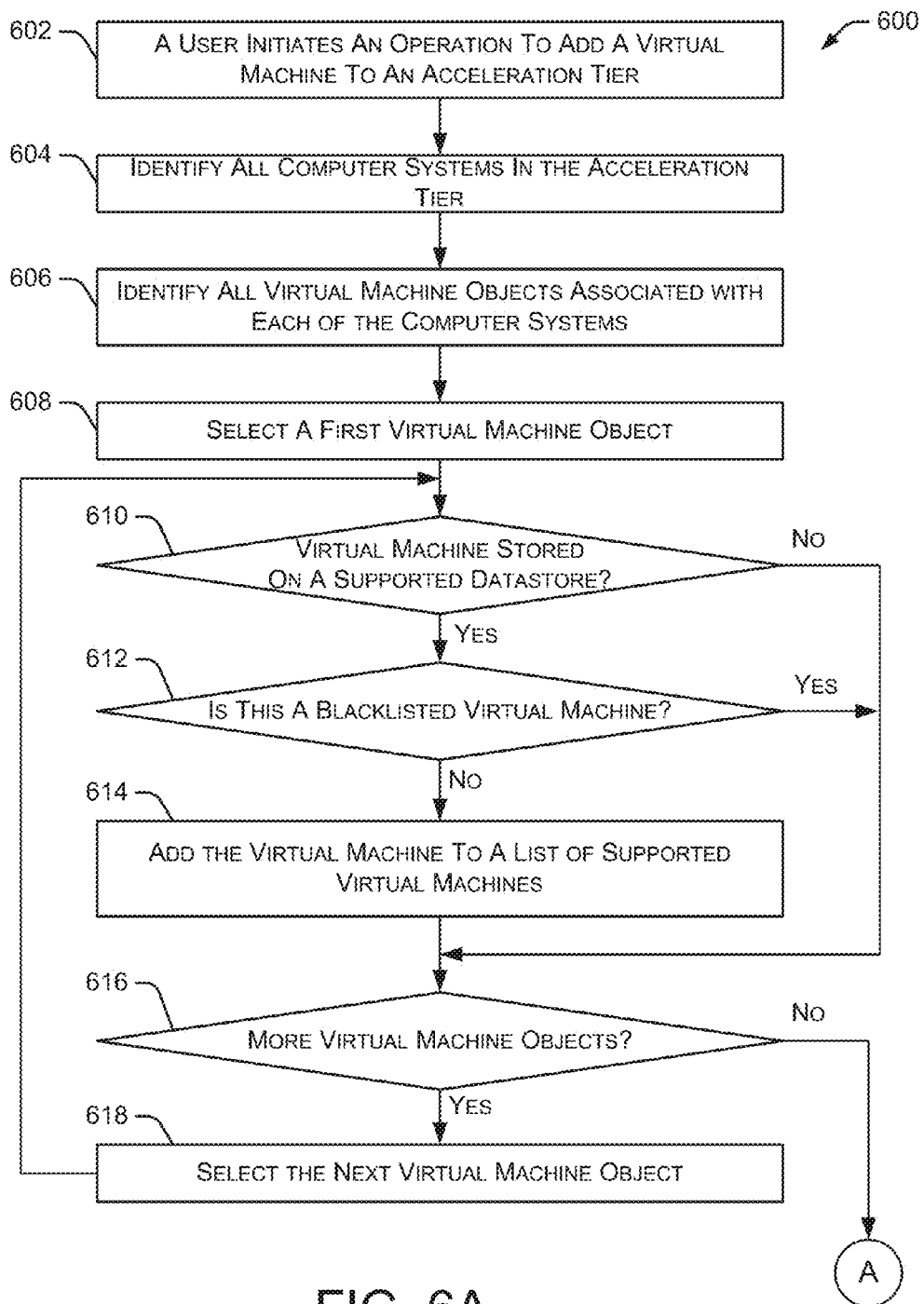
FIGS. 6A and 6B depict a flow diagram illustrating an embodiment of a method for adding a virtual machine to an acceleration tier and managing a dynamic policy.
Figure 6B:
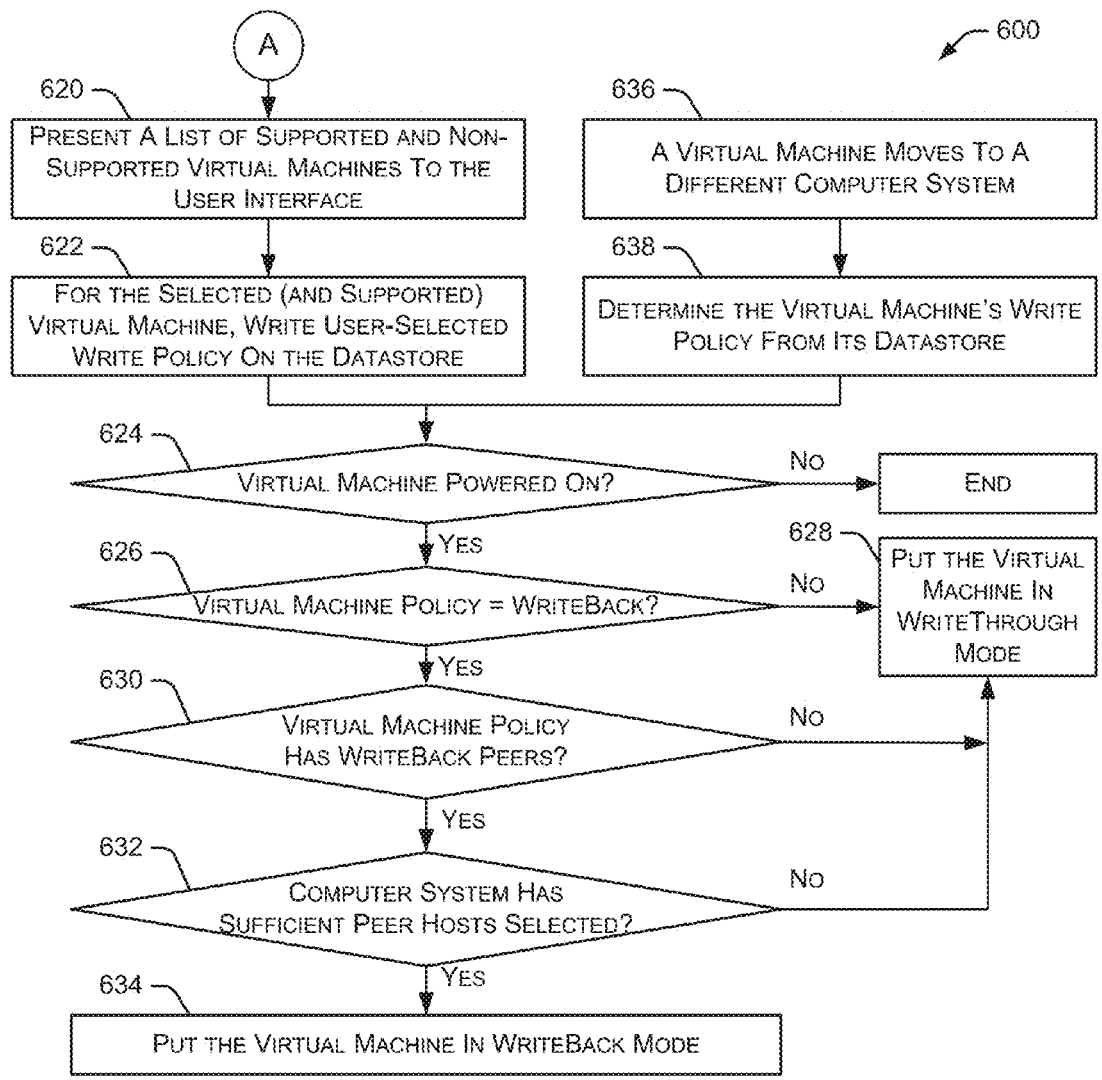

FIGS. 6A and 6B depict a flow diagram illustrating an embodiment of a method 600 for adding a virtual machine to an acceleration tier. Method 600 begins as a user initiates an operation to add a virtual machine to an acceleration tier at 602. Method 600 identifies all computer systems in the acceleration tier at 604 and identifies all virtual machine objects associated with each of the computer systems at 606. A first virtual machine object is selected at 608. Method 600 then determines whether the virtual machine is stored on a supported datastore at 610. If the virtual machine is stored on a supported datastore, the method next determines whether it is a blacklisted virtual machine at 612. Each acceleration tier contains a blacklist of consumers (virtual machines) that will not be accelerated, even if they reside on an object (e.g., datastore) that has been added to the acceleration tier. If the virtual machine is not blacklisted, it is added to a list of supported virtual machines at 614.

Method 600 continues by determining whether additional virtual machine objects remain to be analyzed at 616. If additional virtual machine objects remain, method 600 selects the next virtual machine object at 618 and returns to 610 to analyze the newly selected virtual machine object.

After all virtual machine objects are analyzed, a list of supported and non-supported virtual machines is presented to a user via a user interface at 620. For the selected (and supported) virtual machine, method 600 writes the user-selected write policy on the datastore at 622. Method 600 continues by determining whether the virtual machine is powered on at 624. If the virtual machine is not powered on, the method ends. If powered on, the method 600 continues by determining whether the virtual machine's write policy is WriteBack at 626. If not, the virtual machine is put into WriteThrough mode at 628. If the virtual machine's write policy is WriteBack, method 600 next determines whether the virtual machine policy has WriteBack peers at 630. If not, the virtual machine is put into WriteThrough mode at 628.

If the virtual machine policy has WriteBack peers, method 600 determines whether the computer system has sufficient peer hosts (e.g., computer systems) selected at 632. If not, the virtual machine is put into WriteThrough mode at 628. If the computer system has sufficient peer hosts selected, method 600 puts the virtual machine into WriteBack mode at 634.

FIG. 6B also illustrates a method for handling movement of a virtual machine between two different computer systems. In particular, method 600 detects that a virtual machine has moved to a different computer system at 636. Method 600 determines the virtual machine's write policy from its parent datastore at 638, then continues at 624 in the manner discussed above. For example, if a virtual machine moves from one host to another host, the FVP management server reads the virtual machine's write policy from its parent datastore. In some embodiments, the same datastore is accessible from multiple hosts such that the multiple hosts are reading from the same datastore.

Figure 7:
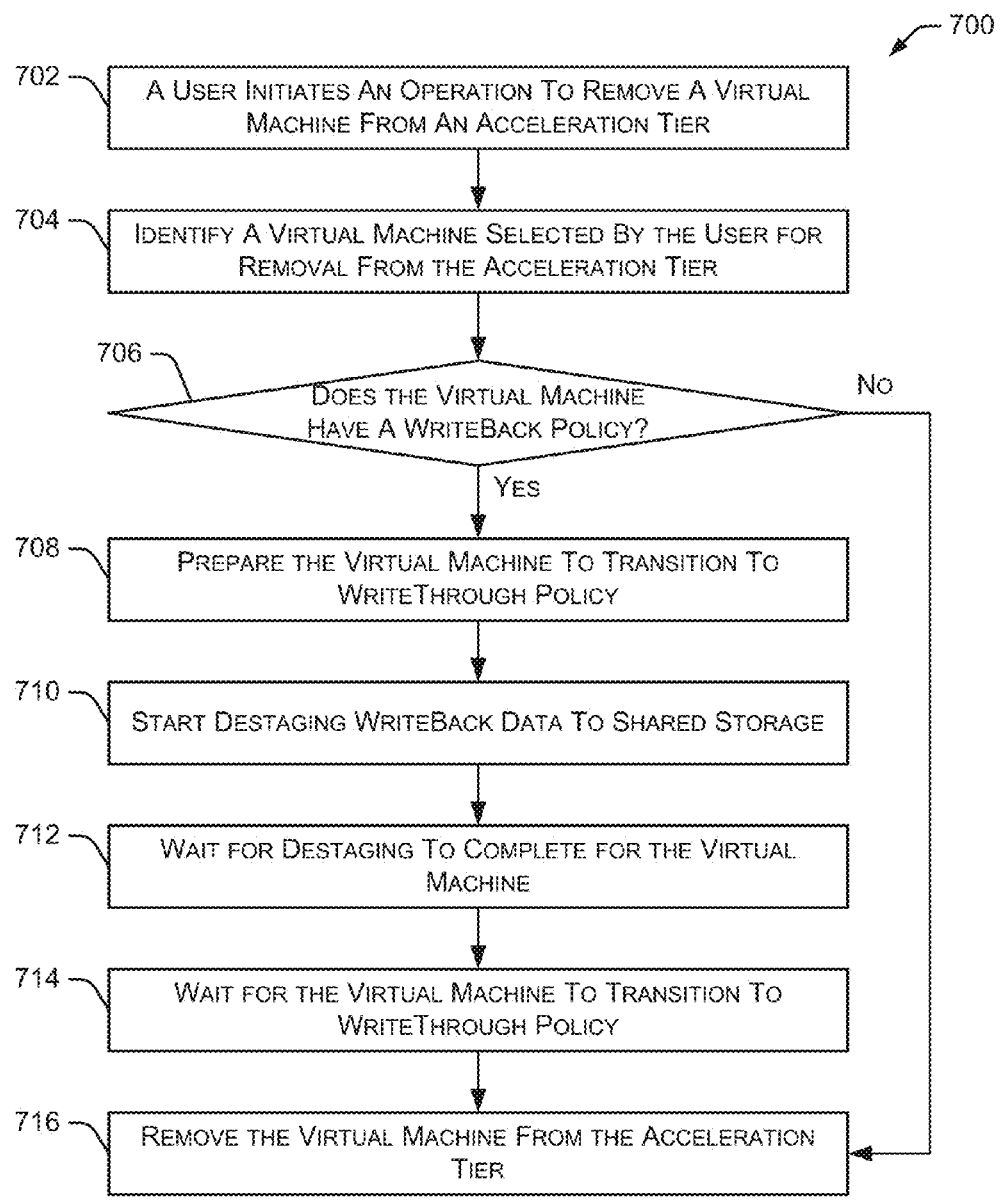
FIG. 7 is a flow diagram depicting an embodiment of a method for removing a virtual machine from an acceleration tier.

FIG. 7 is a flow diagram depicting an embodiment of a method 700 for removing a virtual machine from an acceleration tier. Method 700 begins as a user initiates an operation to remove a virtual machine from an acceleration tier at 702. The method identifies a particular virtual machine selected by the user for removal from the acceleration tier at 704 and determines whether the virtual machine has a WriteBack policy at 706. If the virtual machine does not have a WriteBack policy, the virtual machine is removed from the acceleration tier at 716.

If the virtual machine has a WriteBack policy, method 700 prepares the virtual machine to transition to a WriteThrough policy at 708 and starts destaging the remaining data to shared storage at 710. Method 700 then waits for destaging to complete for the virtual machine at 712 and waits for the virtual machine to transition to WriteThrough policy at 714. The virtual machine is then removed from the acceleration tier at 716.

Figure 8A:
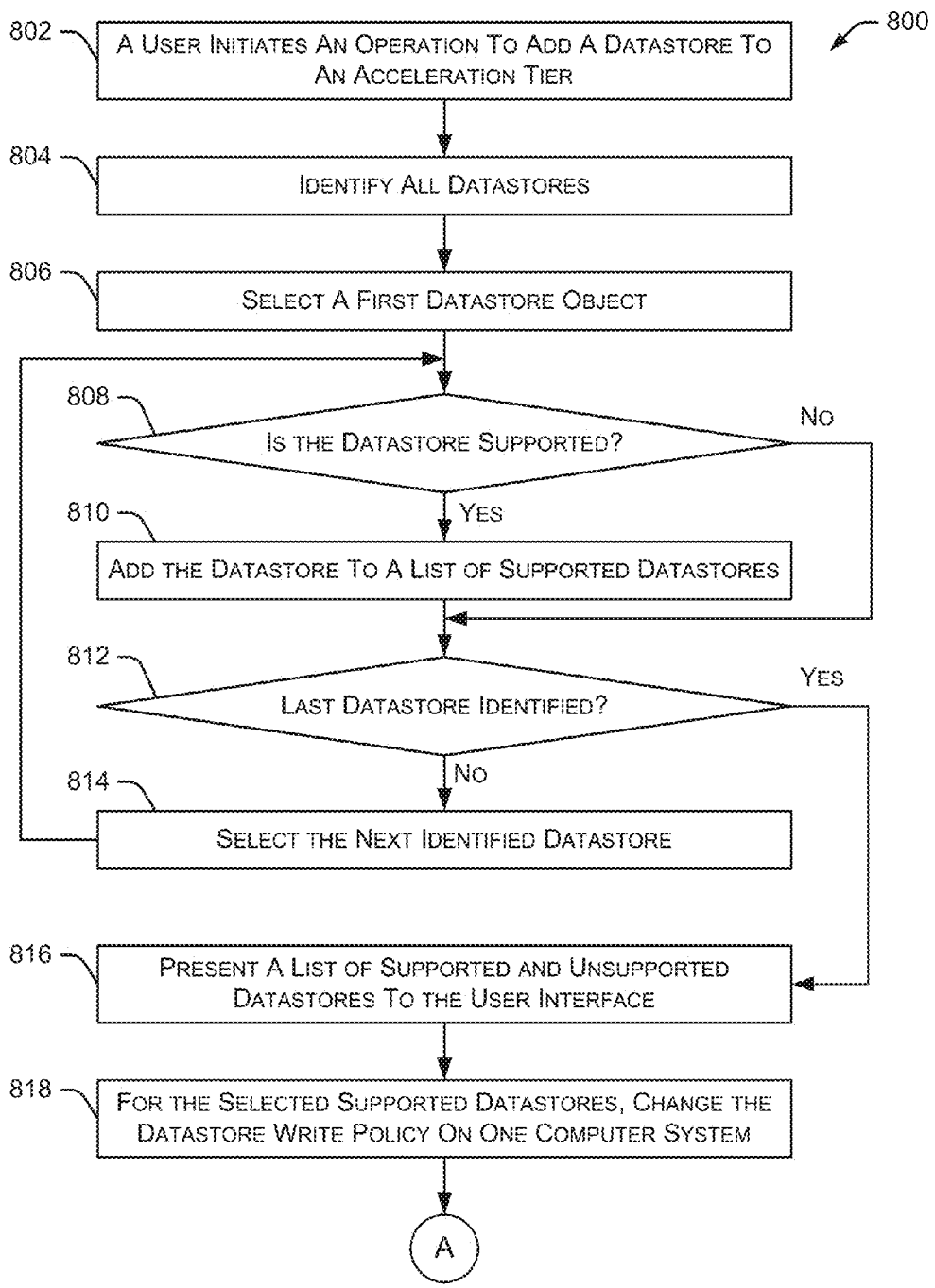
FIGS. 8A and 8B depict a flow diagram illustrating an embodiment of a method for adding a datastore to an acceleration tier.
Figure 8B:
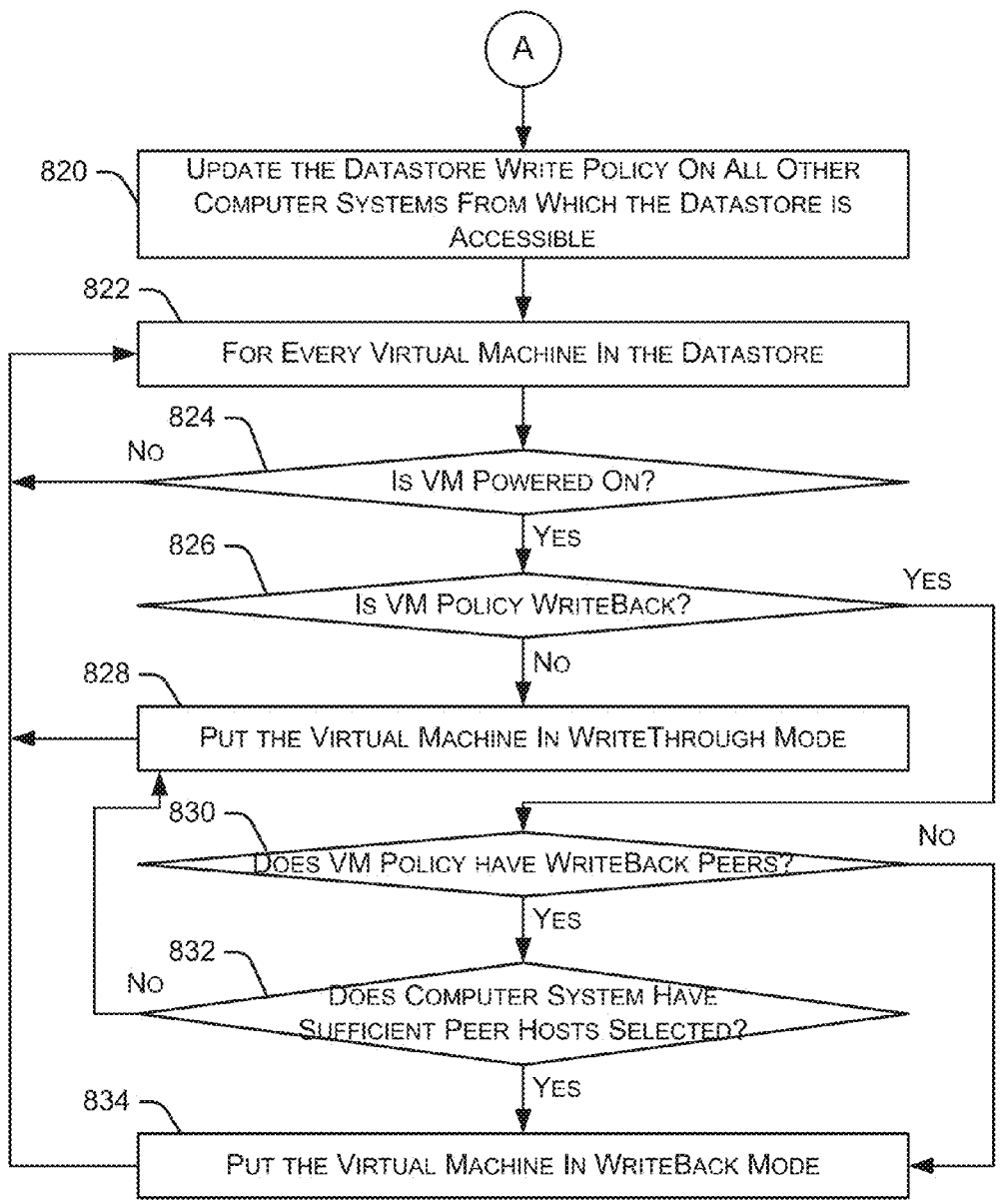

FIGS. 8A and 8B depict a flow diagram illustrating an embodiment of a method 800 for adding a datastore to an acceleration tier. Method 800 starts as a user initiates an operation to add a datastore to an acceleration tier at 802. The method continues by identifying all datastores at 804 and selecting a first datastore object at 806. Method 800 determines whether the datastore is supported at 808. If so, the datastore is added to a list of supported datastores at 810. The method then determines whether the last datastore has been identified at 812. If not, the next identified datastore is selected at 814 and method 800 returns to 808 to determine whether the next identified datastore is supported.

After all datastores have been identified, a list of supported and unsupported datastores are presented to the user via a user interface at 816. For the selected supported datastores, method 800 changes the datastore write policy on one computer system at 818. Additionally, method 800 updates datastore write policies on all other computer systems from which the datastore is accessible at 820. Thus, the FVP management server allows the user to select the write policy (WriteThrough or WriteBack) and writes the selected write policy to the appropriate datastore.

As method 800 continues, for every virtual machine in the datastore at 822, the method determines whether the virtual machine is powered on at 824. If not, the next virtual machine in the datastore is selected. If the virtual machine is powered on, the method determines whether the write policy for the virtual machine is WriteBack at 826. If not, the virtual machine is put into WriteThrough mode at 828. If the virtual machine is requesting WriteBack mode, method 800 determines whether the virtual machine write policy has WriteBack peers at 830. If yes, the method determines whether the computer system has sufficient peer hosts selected at 832. Method 800 then puts the virtual machine into WriteBack mode at 834 and returns to 822 to select the next virtual machine. Thus, the above activity applies a datastore's write policy to all virtual machines in that datastore.

Figure 9:
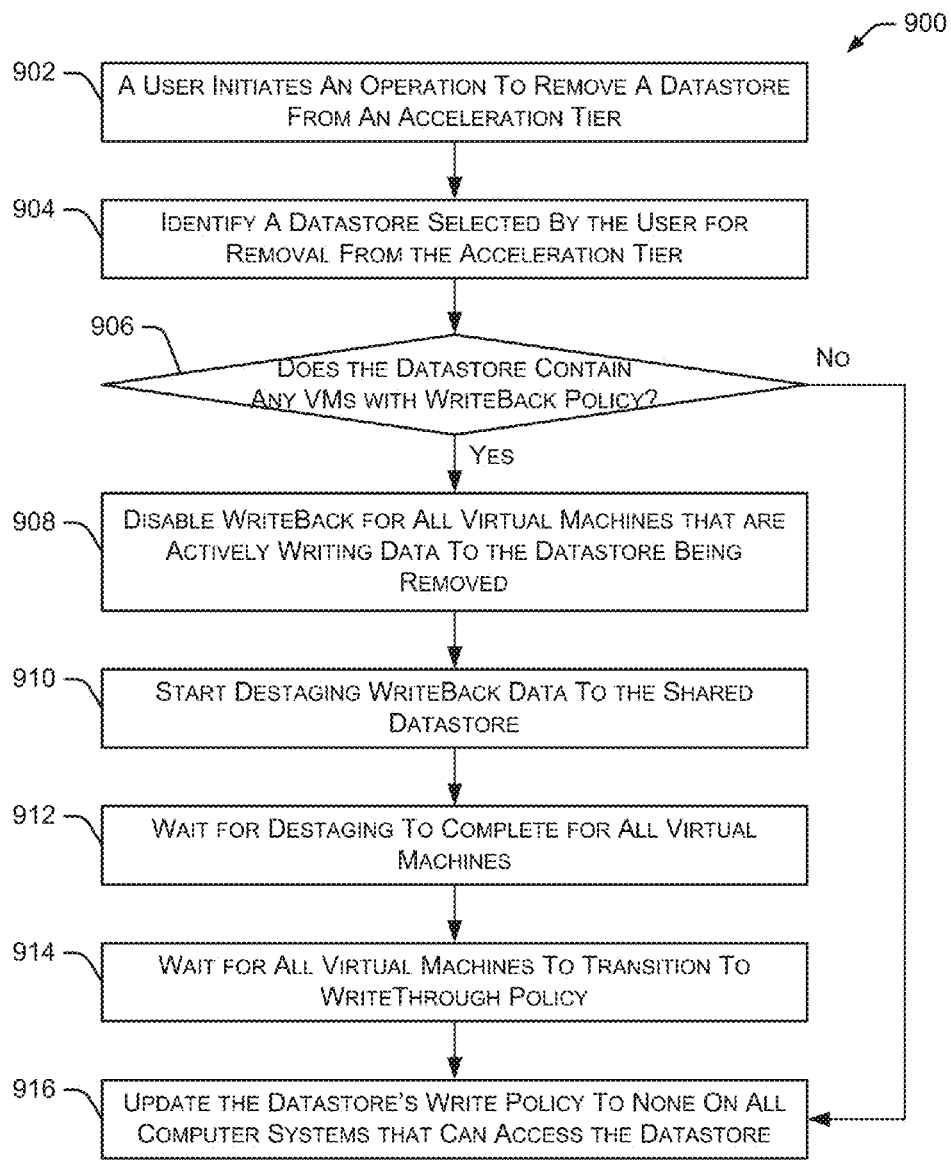
FIG. 9 is a flow diagram depicting an embodiment of a method for removing a datastore from an acceleration tier.

FIG. 9 is a flow diagram depicting an embodiment of a method 900 for removing a datastore from an acceleration tier. Method 900 starts as a user initiates an operation to remove a datastore from an acceleration tier at 902. Method 900 identifies a datastore selected by the user for removal from the acceleration tier at 904 and determines whether the datastore contains any virtual machines with a WriteBack policy at 906. If not, method 900 updates the datastore's write policy to "none" on all computer systems that can access the datastore at 916.

If the datastore contains at least one virtual machine with a WriteBack policy, method 900 disables WriteBack for all virtual machines that are actively writing data to the datastore being removed at 908. Method 900 starts destaging the remaining data to the shared datastore at 910 and waits for destaging to complete for all virtual machines at 912. Method 900 also waits for all virtual machines to transition to WriteThrough policy at 914, then updates the datastore's write policy to "none" on all computer systems that can access the datastore at 916.

Figure 10A:
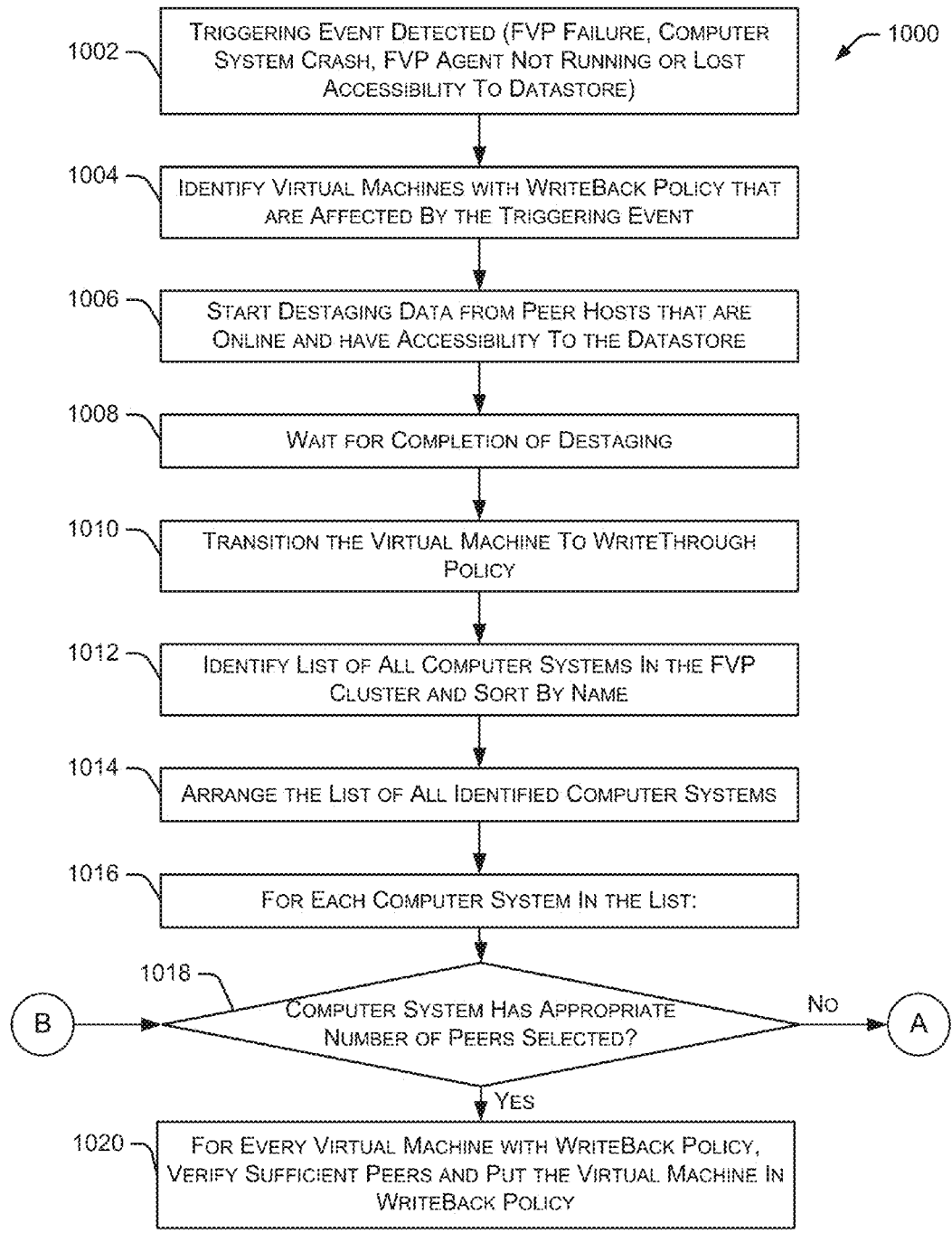
FIGS. 10A and 10B depict a flow diagram illustrating an embodiment of a method for automatic WriteBack peer selection and automatic destaging of writeback data by a peer based on a failure of a primary host.
Figure 10B:
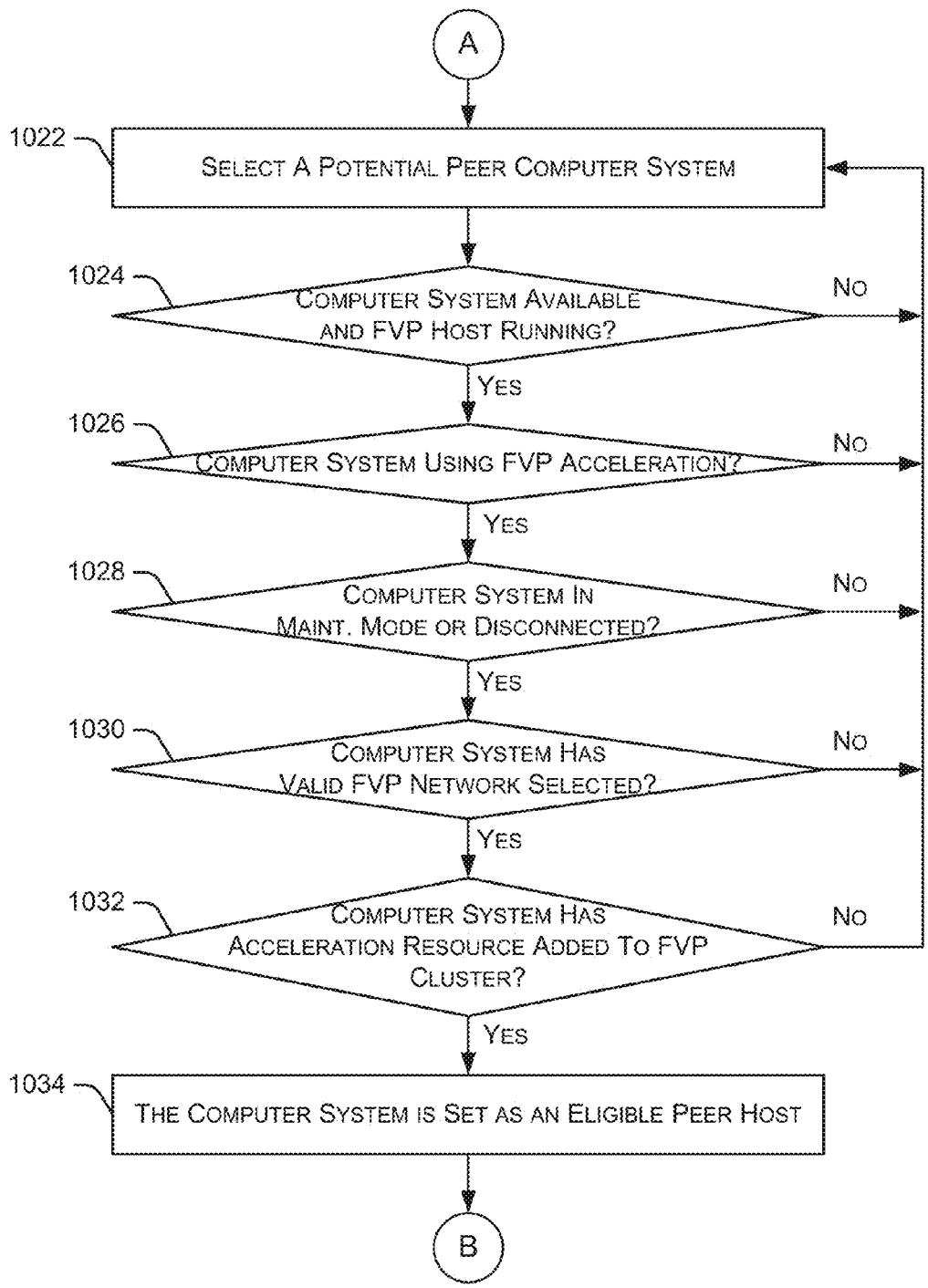

FIGS. 10A and 10B depict a flow diagram illustrating an embodiment of a method 1000 for automatic WriteBack peer selection and automatic destaging of WriteBack data by a peer based on a failure of a primary host. Method 1000 starts as a triggering event is detected at 1002. Example triggering events include a flash device failure on one or more computer systems, a complete computer system crash (or a FVP agent not running), or a computer system losing accessibility to a datastore. The method identifies virtual machines with WriteBack policy that are affected by the triggering event at 1004. Method 1000 starts destaging data from peer hosts (e.g., computer systems) that are online and have accessibility to the datastore at 1006. After completion of destaging at 1008, each virtual machine is transitioned to WriteThrough policy at 1010.

Method 1000 continues by identifying a list of computer systems in the FVP cluster and sorts the list by computer system name at 1012. This step, along with the subsequent series of steps, are performed to reassign peer hosts after a failure occurs, which ensures that each host has two functioning peers. The method then arranges the list of computer systems at 1014. In some embodiments, the computer systems are arranged in a logical ring, where each computer system in a list has a member to the left and a member to the right based on its position in the list. The first computer system in the list uses the last computer system as its "left" member and the last computer system in the list uses the first computer system as its "right" member, thereby forming a ring. For each computer system in the list, the remaining steps shown in FIGS. 10A and 10B are performed at 1016 with respect to each computer system.

If the particular computer system has an appropriate number of peers selected at 1018, for each virtual machine with WriteBack policy, the method verifies at 1020 that sufficient peers exist and puts the virtual machine in Write- Back policy. If the particular system does not have an appropriate number of peers selected at 1018, the method continues by selecting a potential peer computer system at 1022. In some embodiments, the potential peer computer system selected is the computer system to the right in the ring configuration. If that computer system cannot be used as a peer (for one of the reasons discussed below) or if only one peer has been selected, then the next peer to the right will be selected. This continues until two peers are selected for the computer system. In other embodiments, any number of peers may be selected for a particular computer system.

If the computer system is not available or a FVP host is running at 1024, the method returns to select the next computer system at 1022. If the computer system is available and a FVP host is running at 1024, the method determines whether the computer system is using FVP acceleration at 1026. If the computer system is not using FVP acceleration, the method returns to 1022.

If the computer system is using FVP acceleration at 1026, method 1000 determines whether the computer system is in maintenance mode (or disconnected from a vCenter server) at 1028. If the computer system is not in maintenance mode, the method returns to 1022. If the computer system is in maintenance mode, the method continues to 1030 and determines whether the computer system has a valid FVP network selected. If the computer system does not have a valid FVP network selected, the method returns to 1022. If the computer system has a valid FVP network selected, method 1000 determines whether the computer system has an acceleration resource added to the FVP cluster at 1032. If the computer system has an acceleration resource added to the FVP cluster, the computer system is set as an eligible peer host at 1034, and method 1000 returns to 1018 to determine if the computer system has an appropriate number of peers selected. Otherwise, method 1000 returns to 1022 to select the next computer system.

As discussed above with respect to FIGS. 10A and 10B, method 1000 provides for automatic WriteBack peer selection and automatic destaging of WriteBack data by a peer based on a failure of a primary host. Additionally, method 1000 can provide for the initial installation and configuration of a system utilizing one or more WriteBack peers. For example, when installing/configuring a new system, method 1000 may begin at 1012 and perform an initial selection of peers. After this initial selection and configuration is completed, method 1000 continues monitoring the systems for triggering events, as discussed above.

Figure 11:
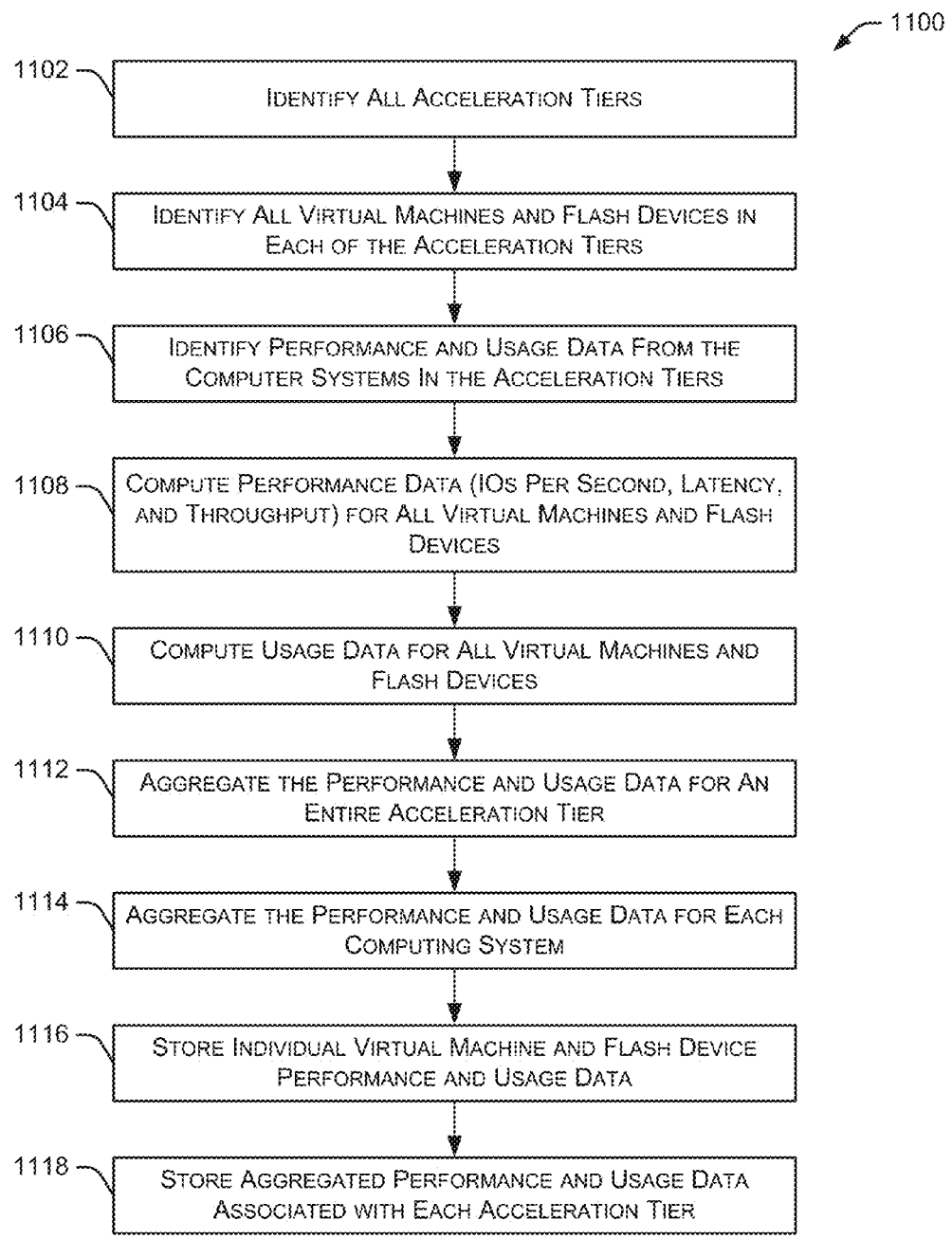
FIG. 11 is a flow diagram depicting an embodiment of a method for collecting performance and usage data for acceleration tiers.

FIG. 11 is a flow diagram depicting an embodiment of a method 1100 for collecting performance and usage data for acceleration tiers. Initially, method 1100 identifies all acceleration tiers at 1102, and identifies all virtual machines and flash devices in each of the acceleration tiers at 1104. Method 1100 continues by identifying performance and usage data from the computer systems in the acceleration tiers at 1106. The method computes performance data (e.g., IOs per second, latency, and throughput) for all virtual machines and flash devices in the FVP clusters at 1108.

For virtual machines, in addition to the overall effective performance (as seen by the virtual machine), data is collected about the performance of the different types of storage it is using. This includes flash used from the local computer system, flash used from computer systems that reside somewhere on the network, and the underlying persistent datastore. Additionally, the performance of Read IOs and Write IOs are tracked. Finally, the cross-section of those items is also collected (e.g., "Local Flash Read", or "Datastore Write"). For flash devices, in addition to the overall effective performance (as seen by the flash device), data is collected about the performance of VM Read IOs and VM Write IOs, as well as IOs done by the system for its own internal purposes.

Usage data is computed for all virtual machines and flash devices at 1110. Usage data includes the amount of acceleration resources that a particular virtual machine is using. This usage data can be reported at multiple levels, such as the aggregate usage across all hosts, the usage across an entire network, the local usage, and the amount used for WriteBack destaging. Method 1100 continues by aggregating the performance and usage data for an entire acceleration tier at 1112 and aggregating the performance and usage data for each computing system at 1114. Performance and usage data associated with individual virtual machines and individual flash devices is stored at 1116, and aggregated performance and usage data associated with each acceleration tier is stored at 1118.

Figure 12:
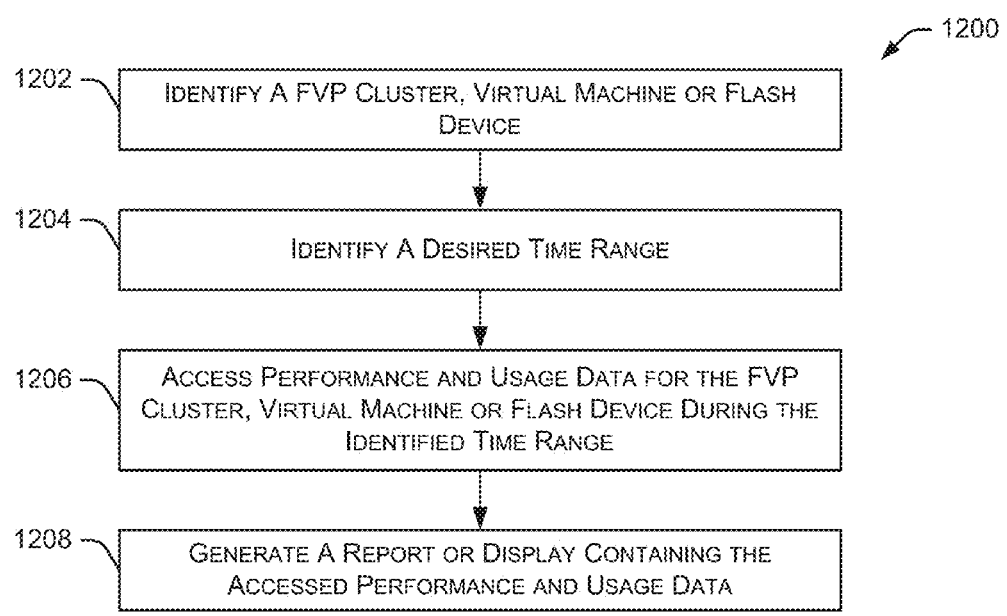
FIG. 12 is a flow diagram depicting an embodiment of a method for reporting performance and usage data.

FIG. 12 is a flow diagram depicting an embodiment of a method 1200 for reporting performance and usage data. Initially, method 1200 identifies a FVP cluster, virtual machine or flash device at 1202 and identifies a desired time range at 1204. The identified FVP cluster, virtual machine, flash device or time range may be identified (or defined) by a user desiring a report detailing system performance and usage. Method 1200 accesses performance and usage data for the FVP cluster, virtual machine or flash device during the identified time range at 1206. A report (or user interface display) is generated containing the accessed performance and usage data during the identified time range at 1208.

In specific embodiments, the performance data includes aggregated data at the FVP cluster level, at the individual computer system level, at the individual virtual machine level or at the individual flash device level. The user interface for defining and generating performance reports allows the user to define time ranges such as "last 10 minutes" or custom time ranges selected by the user. The user interface also presents options for choosing performance data related to IOPs, Latency or Throughput.

Figure 13:
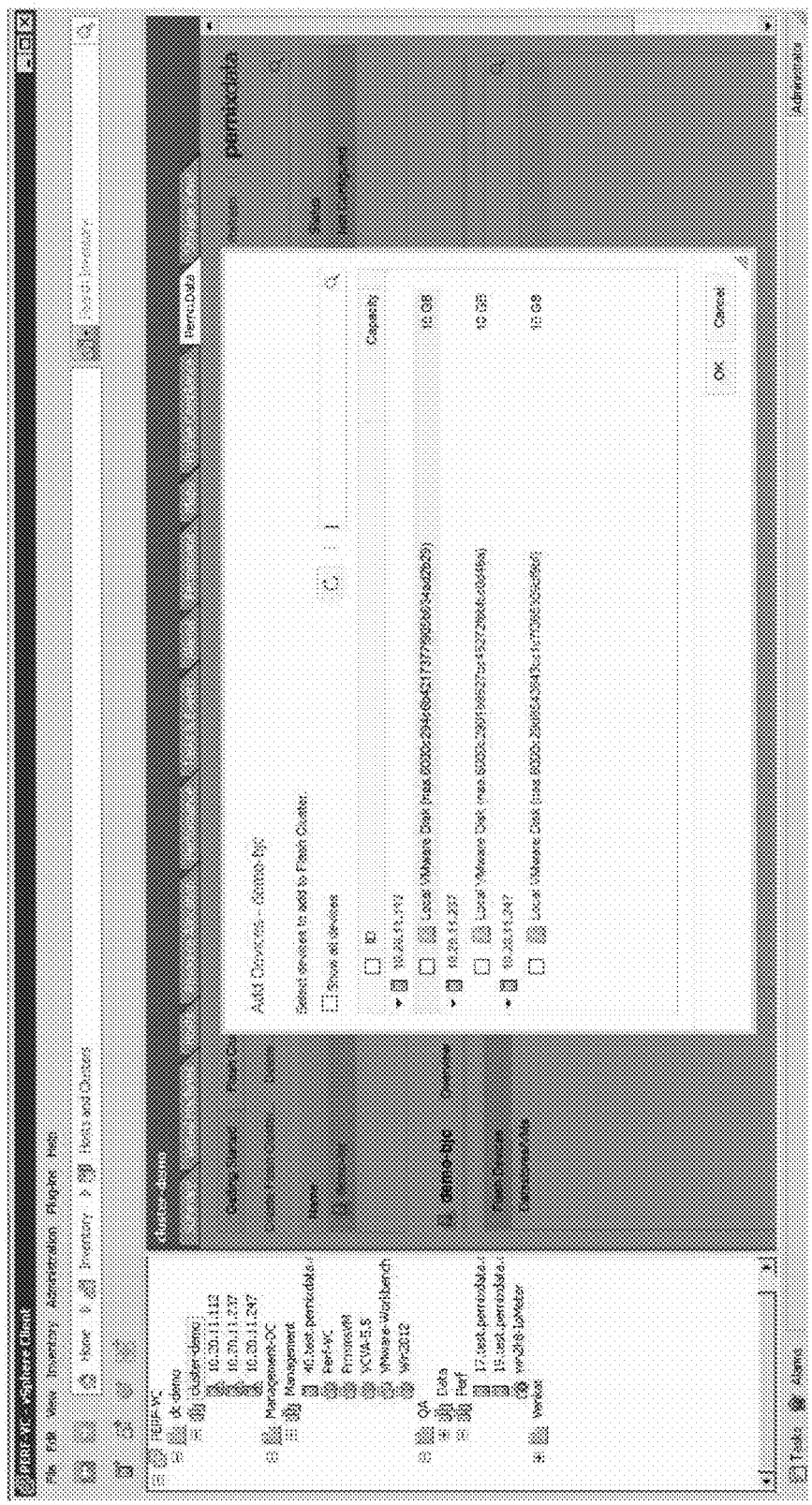
FIGS. 13-26 illustrate various example screen shots related to a graphical user interface (GUI) that allows a user to configure, manage, and modify shared cache resources, computer systems, and other components discussed herein.
Figure 14:
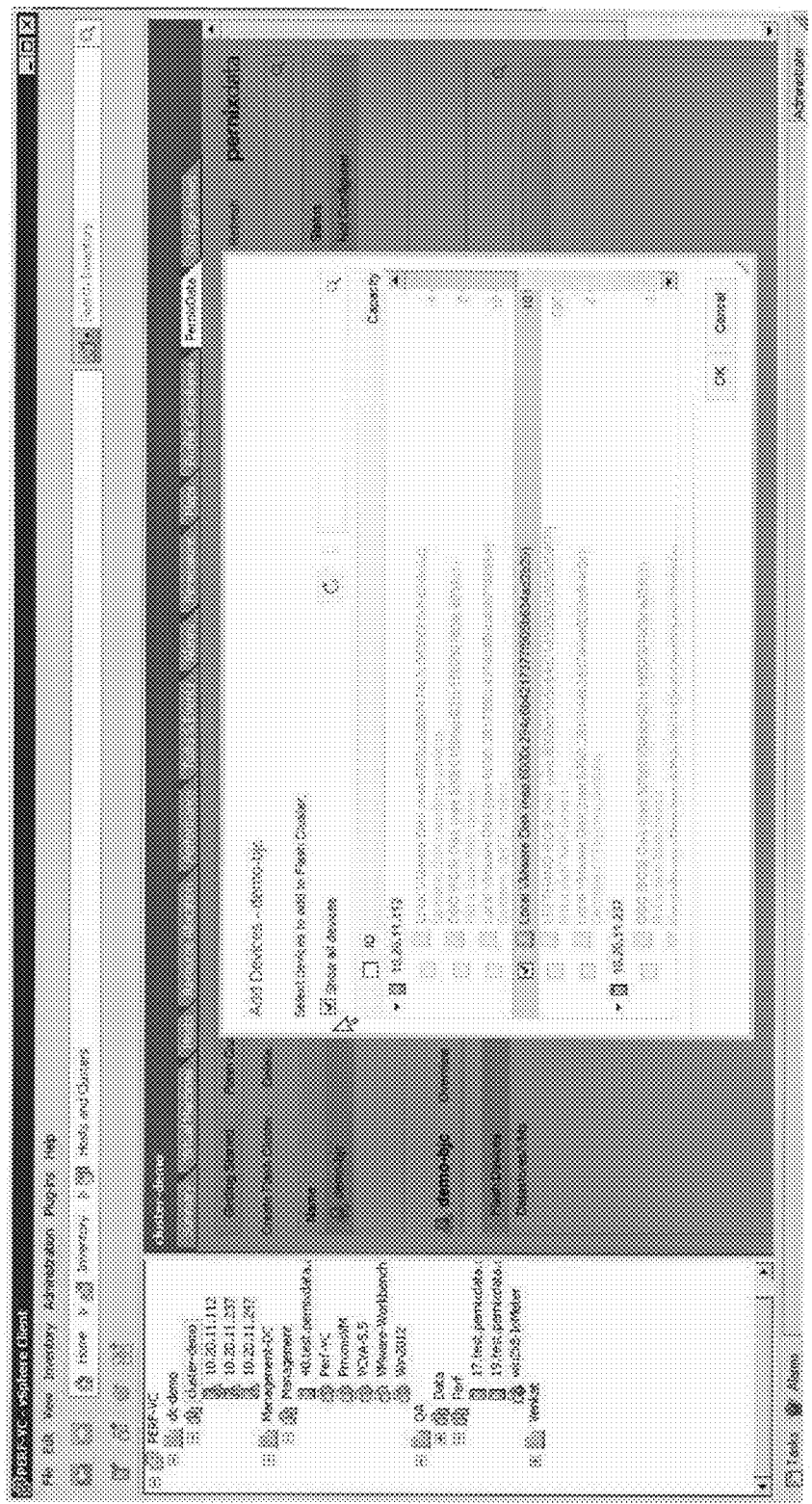
Figure 15:
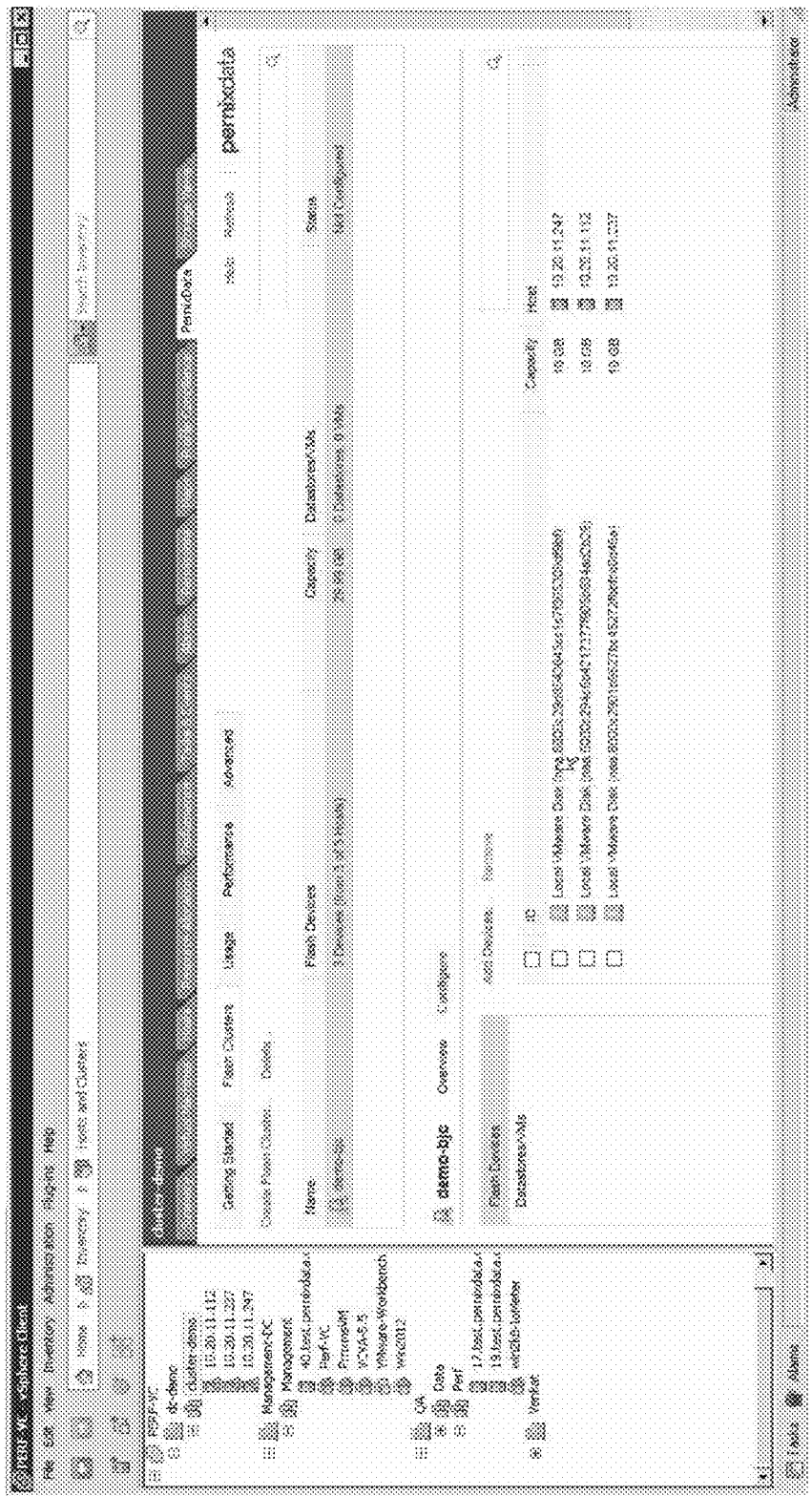

FIGS. 13-26 illustrate various example screen shots related to a graphical user interface (GUI) that allows a user to configure, manage, and modify shared cache resources, computer systems, and other components discussed herein. In particular, FIGS. 13 and 14 illustrate GUI screens related to the creation of a new flash cluster. As used herein, a "flash cluster" is substantially equivalent to an acceleration tier or "FVP cluster." While a flash cluster typically includes flash devices, an FVP cluster may include flash devices, RAM devices, and any other type of memory or storage device. FIG. 15 illustrates a GUI screen related to selecting one or more flash devices.

Figure 16:
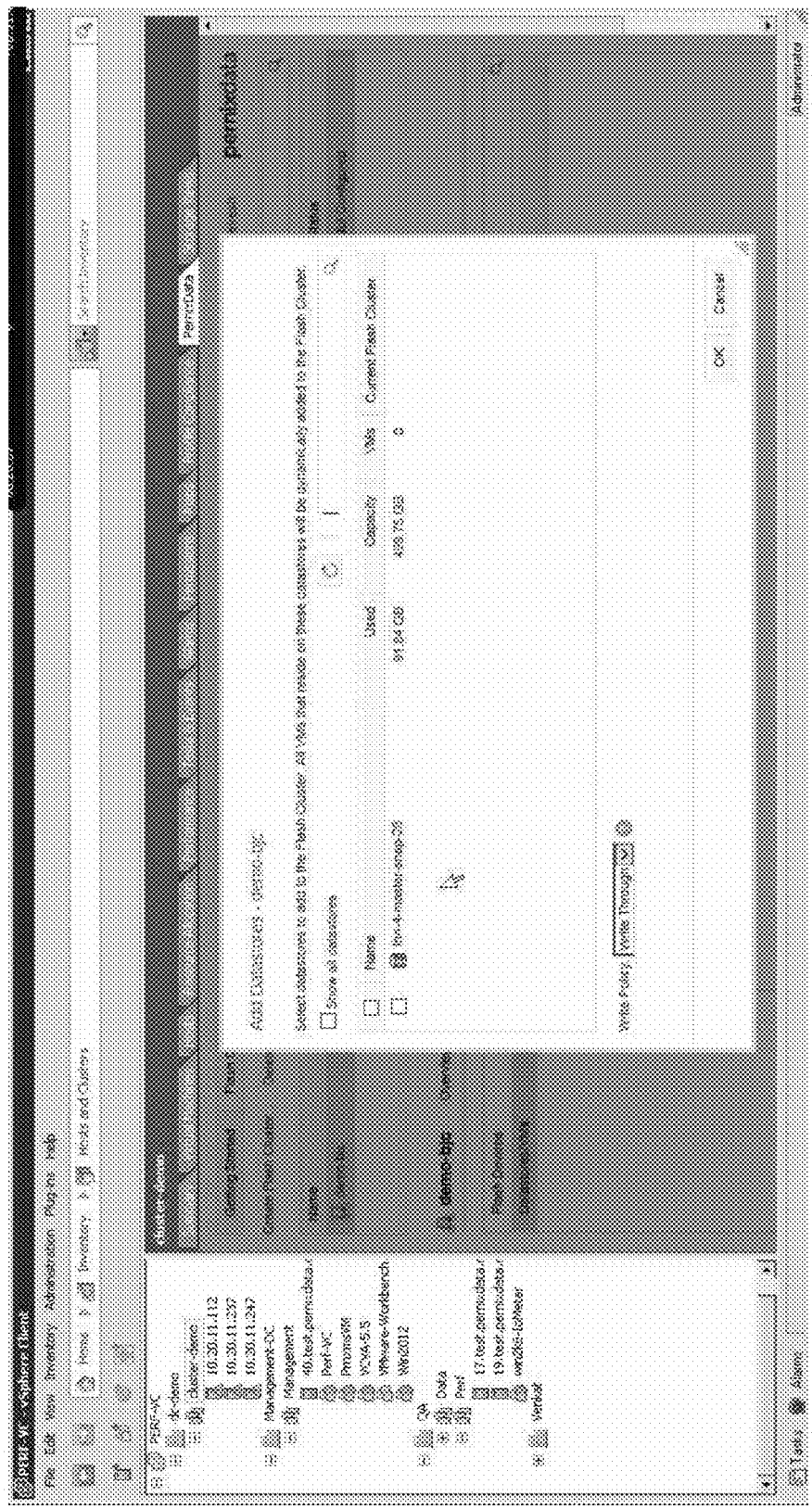
Figure 17:
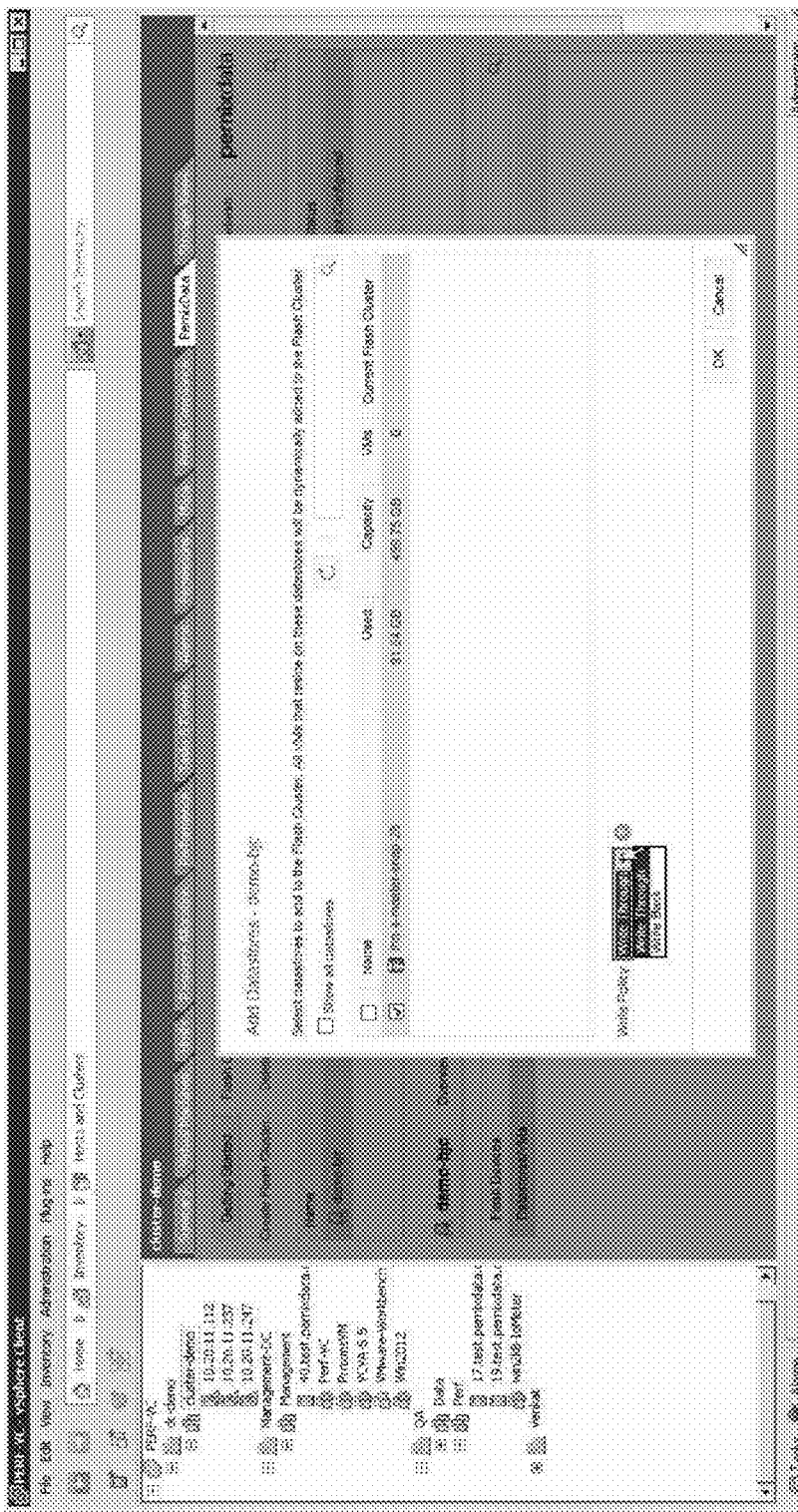

FIGS. 16 and 17 illustrate a GUI screen related to adding datastores. FIG. 17 also displays selection of a particular write policy, such as WriteThrough or WriteBack. If the WriteThrough policy is selected, write operations are written directly to the storage system and also to cache memory—so these write operations are not accelerated. However, read operations are accelerated. If the WriteBack policy is selected, the datastore (or virtual machine) is operating in an accelerated mode (for both data read operations and data write operations), as discussed herein. The operation is accelerated because the virtual machine writes the data to the cache, then moves on to the next operation without waiting for the data to be written to the storage system. When operating in WriteBack mode, data stored to the cache is written asynchronously to the storage system.

Figure 18:
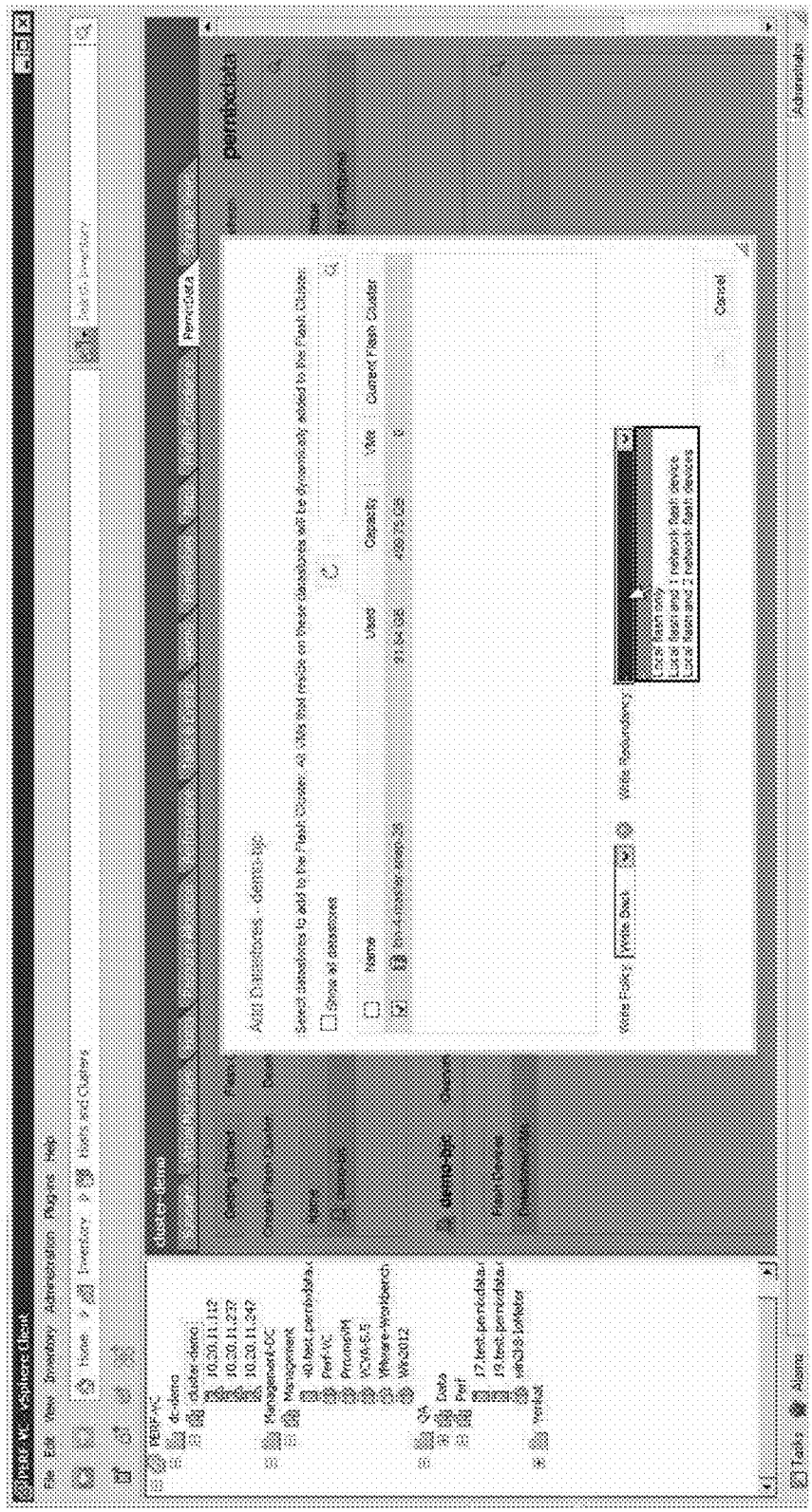

FIG. 18 displays selection of a specific write redundancy, such as local flash only, local flash and one network flash device or local flash and two network flash devices. This write redundancy is necessary since data written to the cache is not immediately written to the storage system (e.g., storage system 240 in FIG. 2). Thus, if the cache fails before the data is written to the storage system, there is no backup copy of the data. To avoid this problem, the user has options to back up the data to one or two network flash devices located on different computer systems. If the primary cache fails before the data is written to the storage system, one of the backup flash devices will write the data to the storage system instead. In some embodiments, if there are not enough backup devices available to support the selected WriteBack policy, the system may automatically limit the user's selections, or change existing selections to protect the data. For example, if there are no backup devices available, the system may automatically change the virtual machine's policy to WriteThrough until additional backup devices are available to support the WriteBack policy. In some embodiments, after the cache data is successfully written to the storage system, the backup data stored in the backup devices is lazily deleted as the backup devices need the storage space occupied by the old backup data. This approach of lazily deleting the backup data reduces pressure on the backup devices and extends the device's lifetime.

Figure 19:
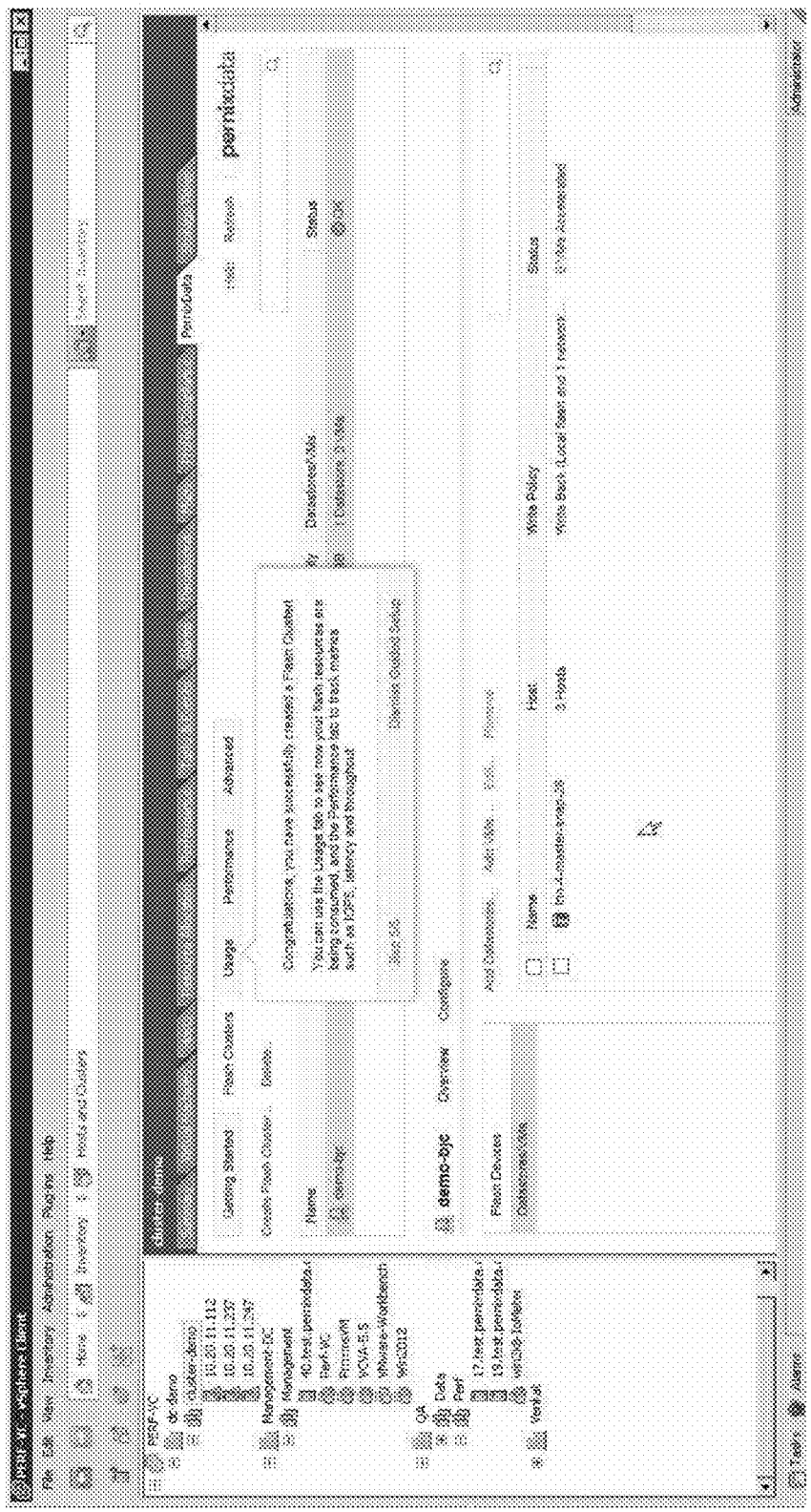
Figure 20:
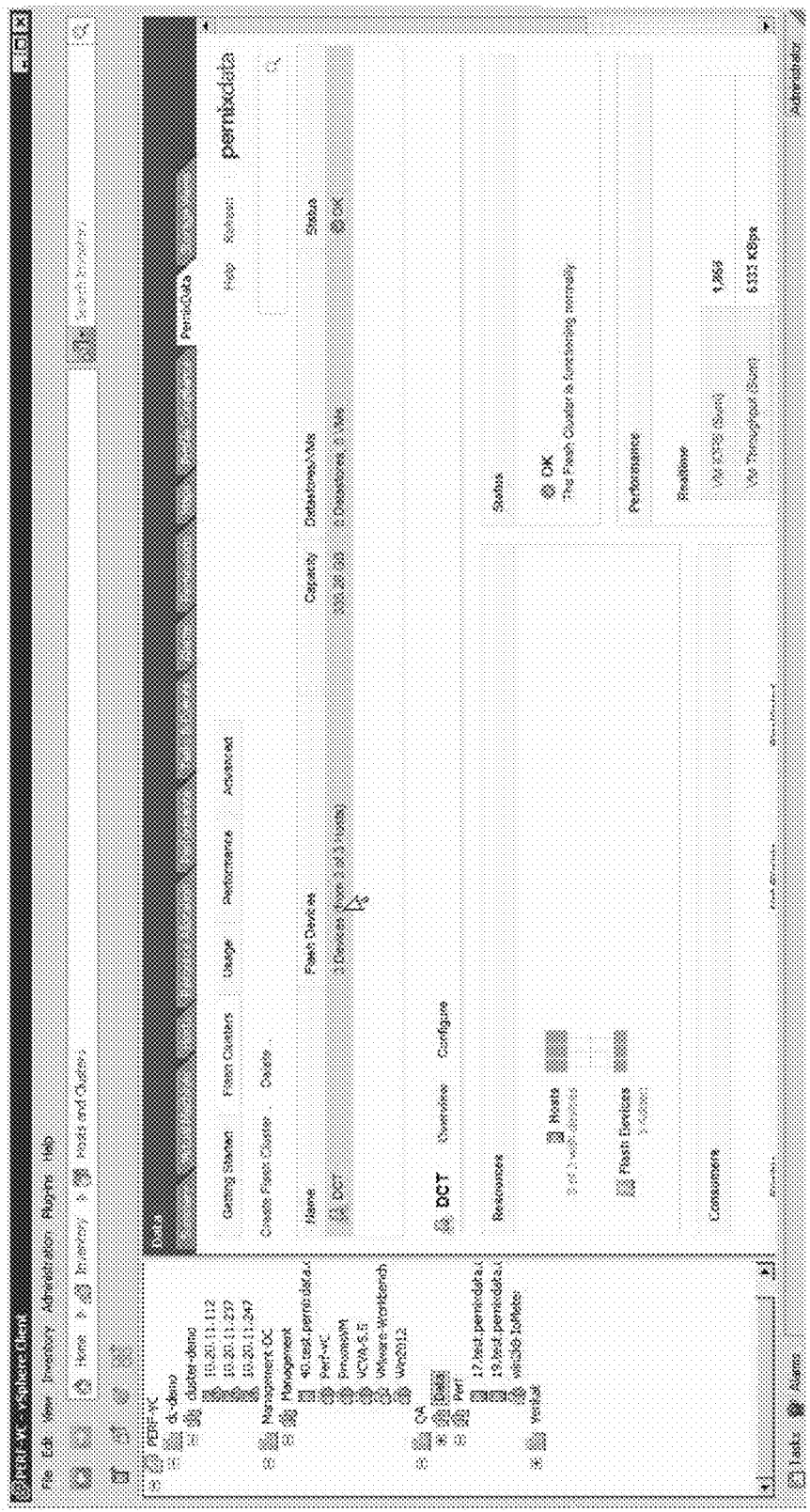
Figure 21:
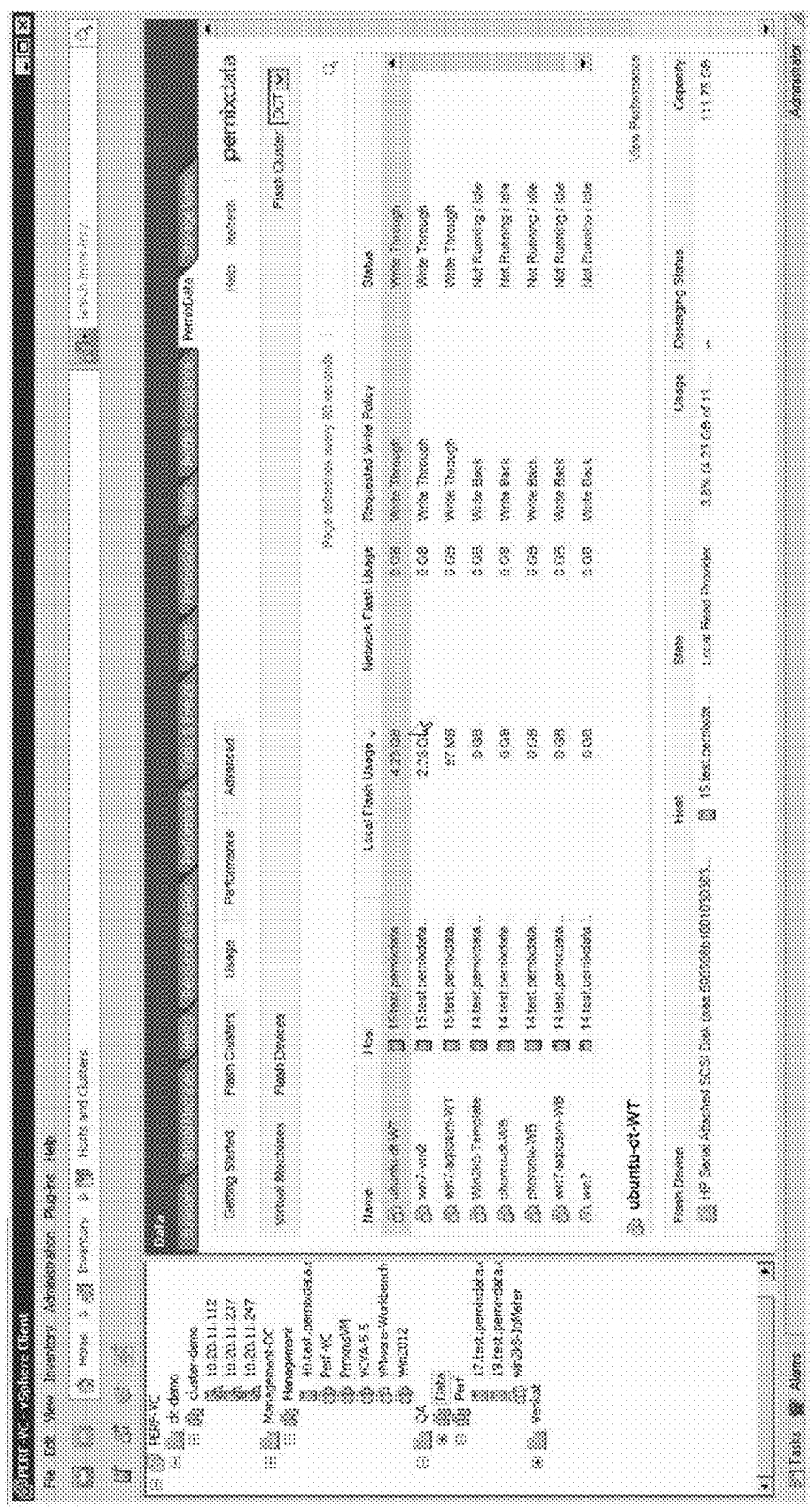
Figure 22:
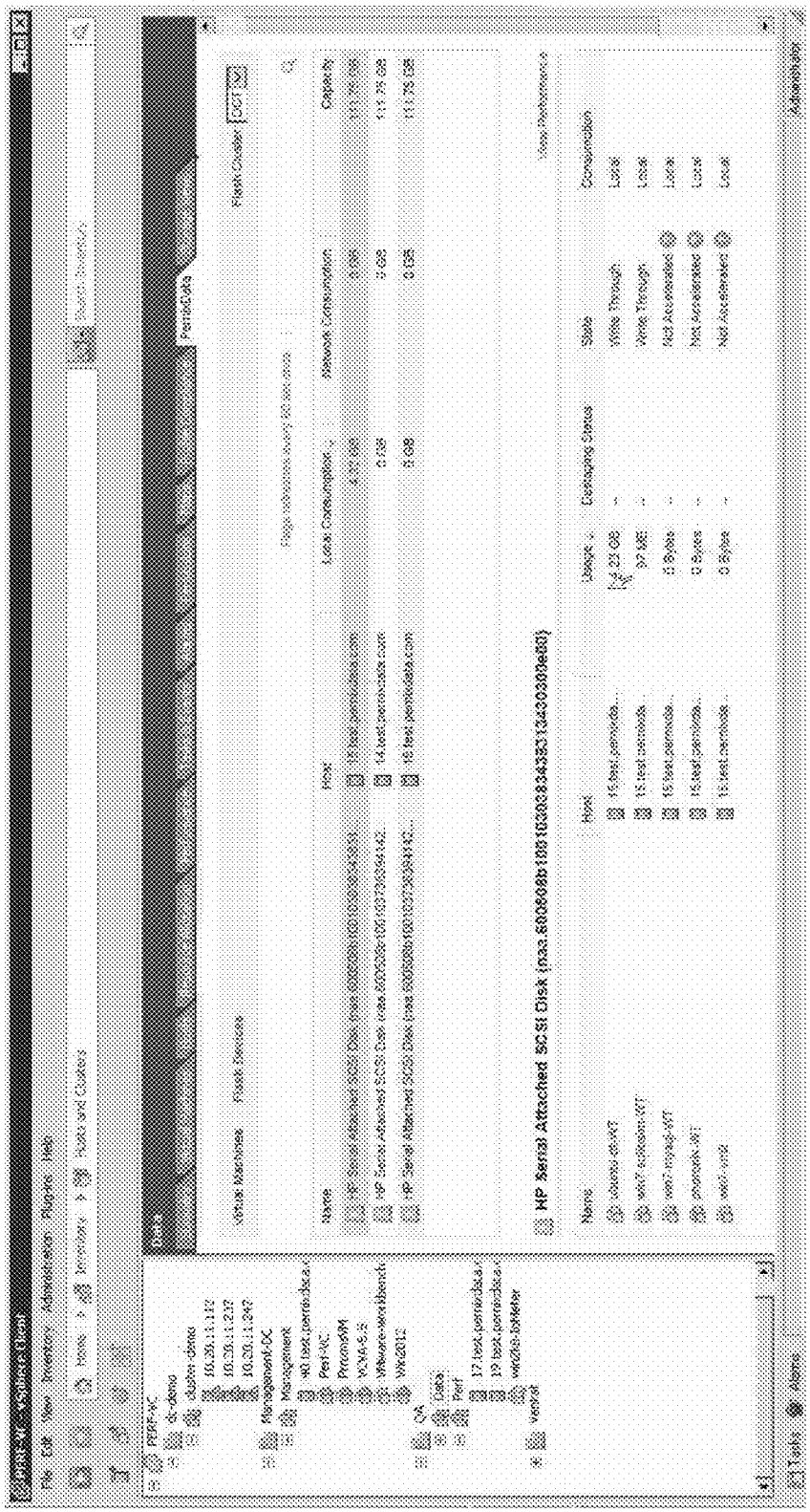
Figure 23:
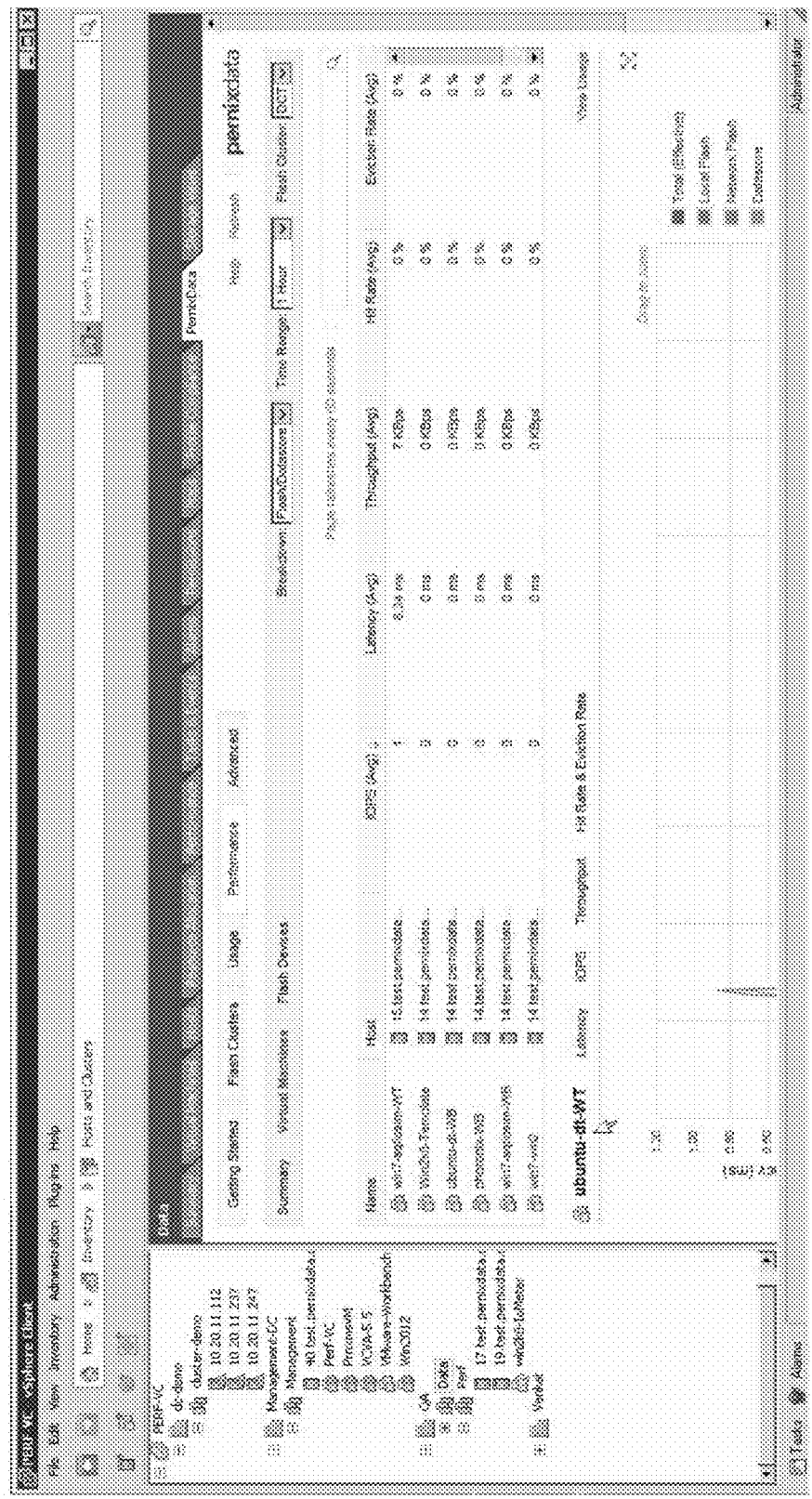
Figure 24:
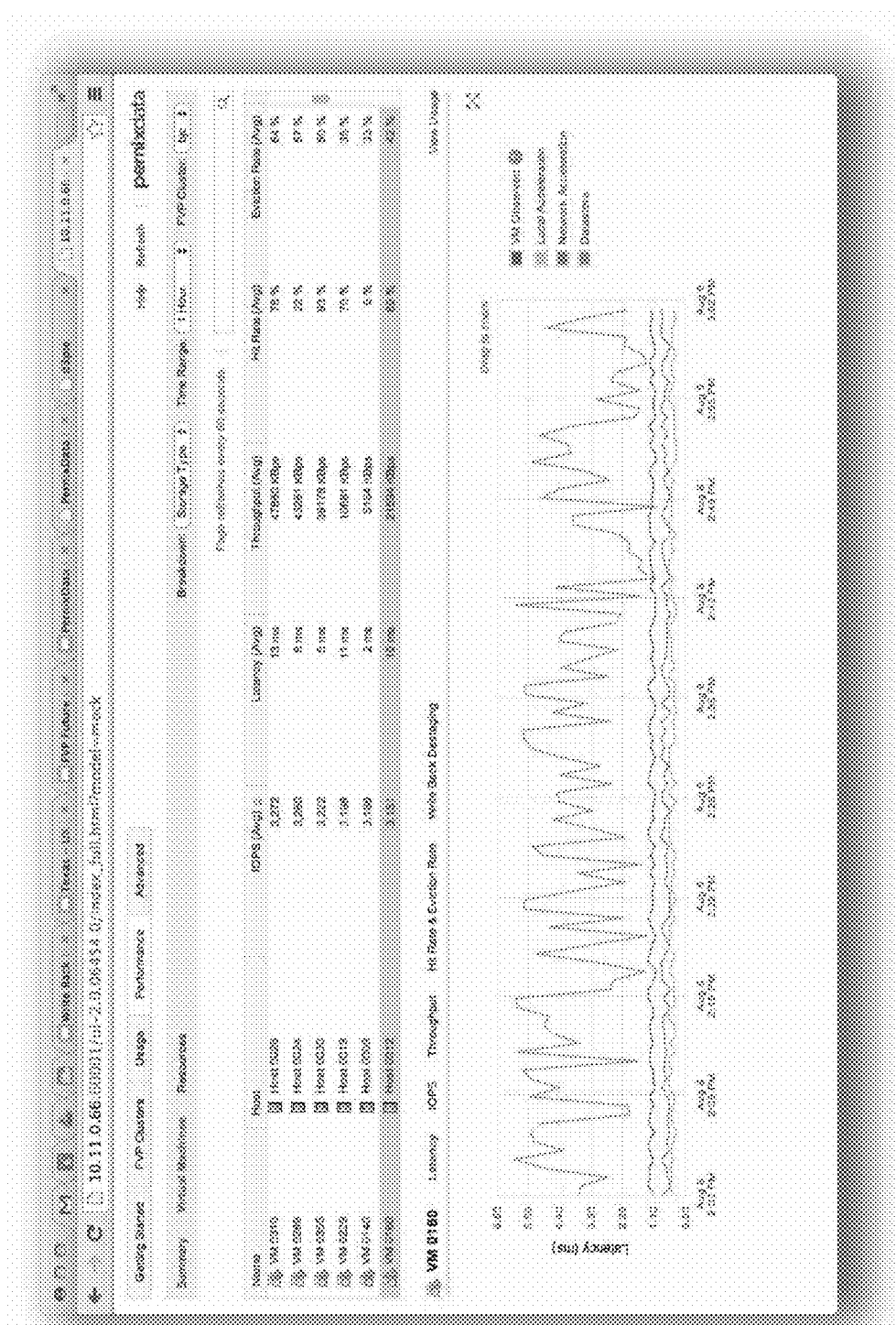
Figure 25:
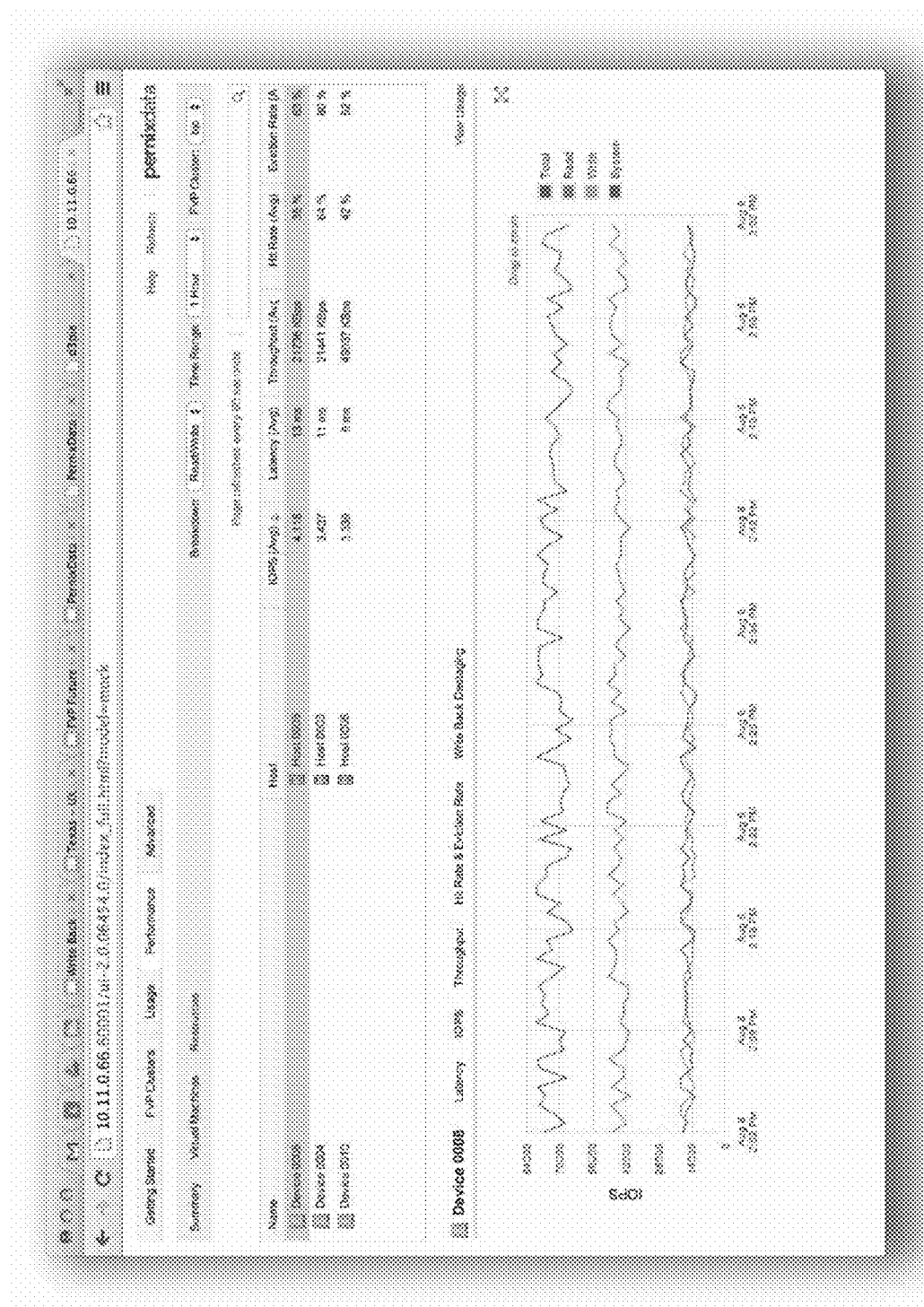

FIG. 19 illustrates a GUI screen related to successful creation of a flash cluster. FIG. 20 illustrates three devices selected by a user to include in the flash cluster. FIGS. 21-26 illustrate GUI screens related to displaying various configuration, status, and performance data associated with any number of flash clusters, VMs, flash devices, computer systems, storage systems, and the like. For example, FIG. 21 shows the operating status of various hosts and flash devices. In some embodiments, hosts and flash devices illustrated using green boxes are operating properly. Other colors (e.g., red or yellow) indicate a problem, potential problem or failure of the associated host or flash device. A user can hover a pointer over a host or flash device to see more details regarding the current status. The GUI screens can also display performance information, such as VM IOPS, VM throughput, VM latency, flash hit rate, flash eviction rate, IOs saved from datastore, Datastore bandwidth saved, and writes accelerated.

In some embodiments, GUI screens display various examples of status reporting, such as write back status, synchronization status, and the like. For example, "destaging status" indicates the amount of data remaining to be written to a storage system. For a peer, the GUI displays "Ready in case of failure," indicating the data has been successfully replicated. Possible device states include "read peer," "write peer," and "primary." A "primary" state indicates that the device is currently responsible for committing WriteBack data to the storage system. A "read peer" state occurs when a virtual machine migrates to a new computer system, but it continues accessing the read cache on the old computer system until the read cache is fully populated on the new computer system.

Figure 26:
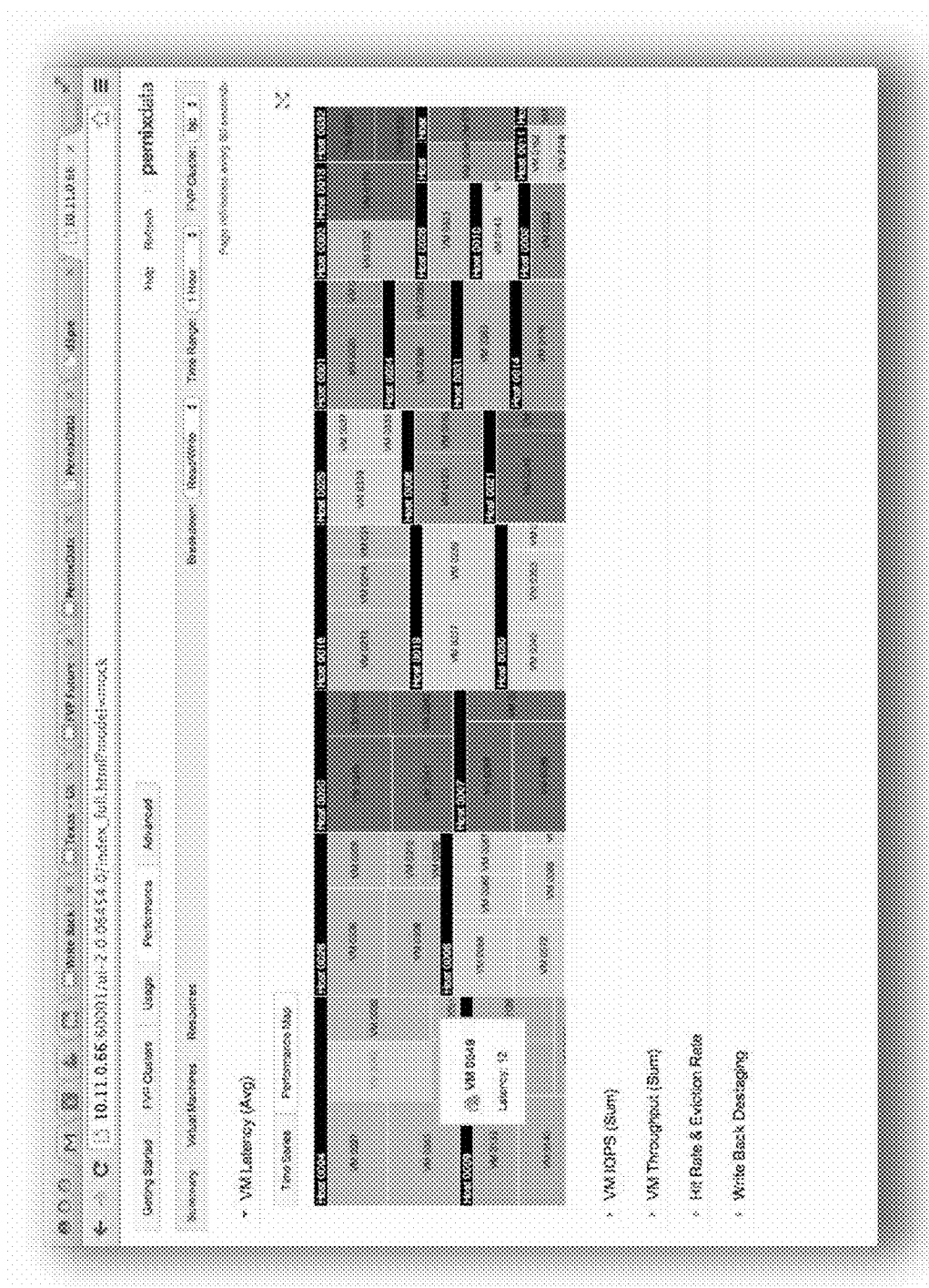

FIGS. 23-26 illustrate GUI screens related to performance charts for the FVP cluster, virtual machine, and a flash device. In particular, FIG. 26 illustrates a performance map for an entire FVP cluster. The larger boxes represent a single computer system. The individual boxes within that larger box (and delineated by white lines) represent virtual machines on that computer system. For example, the upper-left hand corner of FIG. 26 shows a group of boxes associated with the same computer system. The individual boxes represent virtual machines on that computer system and the size of each box is determined based on each virtual machine's latency. Since the box in the lower-left has the largest size in that group, it has the highest latency. Since the lower-right box is the smallest, it has the lowest latency.

Figure 27:
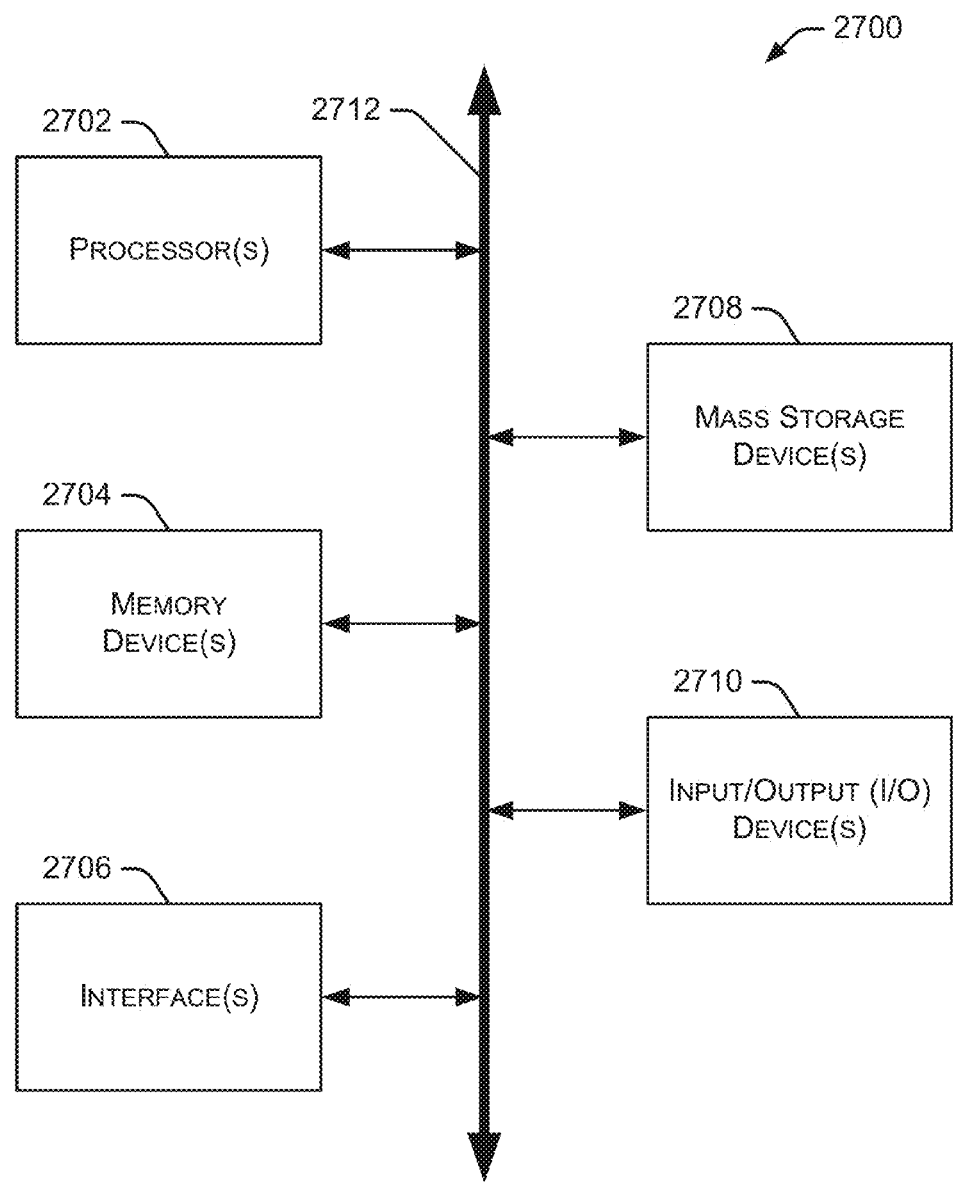
FIG. 27 is a block diagram depicting an example computing device.

FIG. 27 is a block diagram depicting an example computing device 2700. Computing device 2700 may be used to perform various procedures, such as those discussed herein. Computing device 2700 can function as a server, a client or any other computing entity. For example, computing device 2700 may function as FVP management server 104 (FIG. 1) or one of the computer systems shown in FIG. 2. Computing device 2700 can be any of a wide variety of computing devices, such as a desktop computer, a notebook computer, a server computer, a handheld computer, a tablet, and the like.

Computing device 2700 includes one or more processor(s) 2702, one or more memory device(s) 2704, one or more interface(s) 2706, one or more mass storage device(s) 2708, and one or more Input/Output (I/O) device(s) 2710, all of which are coupled to a bus 2712. Processor(s) 2702 include one or more processors or controllers that execute instructions stored in memory device(s) 2704 and/or mass storage device(s) 2708. Processor(s) 2702 may also include various types of computer-readable media, such as cache memory.

Memory device(s) 2704 include various computer-readable media, such as volatile memory (e.g., random access memory (RAM)) and/or nonvolatile memory (e.g., read-only memory (ROM)). Memory device(s) 2704 may also include rewritable ROM, such as Flash memory.

Mass storage device(s) 2708 include various computer readable media, such as magnetic tapes, magnetic disks, optical disks, solid state memory (e.g., Flash memory), and so forth. Various drives may also be included in mass storage device(s) 2708 to enable reading from and/or writing to the various computer readable media. Mass storage device(s) 2708 include removable media and/or non-removable media.

I/O device(s) 2710 include various devices that allow data and/or other information to be input to or retrieved from computing device 2700. Example I/O device(s) 2710 include cursor control devices, keyboards, keypads, microphones, monitors or other display devices, speakers, printers, network interface cards, modems, lenses, CCDs or other image capture devices, and the like.

Interface(s) 2706 include various interfaces that allow computing device 2700 to interact with other systems, devices, or computing environments. Example interface(s) 2706 include any number of different network interfaces, such as interfaces to local area networks (LANs), wide area networks (WANs), wireless networks, and the Internet.

Bus 2712 allows processor(s) 2702, memory device(s) 2704, interface(s) 2706, mass storage device(s) 2708, and I/O device(s) 2710 to communicate with one another, as well as other devices or components coupled to bus 2712. Bus 2712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2700, and are executed by processor(s) 2702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   identifying, using one or more processors, a plurality of available host systems in a cluster;
   receiving a user selection of at least one available cache resource in the identified plurality of available host systems;
   presenting the user with an option to select a cache operating mode of the selected cache resource as a writethrough cache operating mode or a writeback cache operating mode;
   receiving a user selection of the writeback cache operating mode; and
   responsive to receiving the user selection of the writeback cache operating mode:
      automatically selecting at least one backup cache associated with the selected cache resource; and
      configuring the at least one backup cache.

2. The method of claim 1, wherein the backup cache is contained in a host system different from the host system that contains the available cache resource.

3. The method of claim 1, wherein presenting the user with an option to select a cache operating mode further includes presenting an option to select a quantity of backup caches automatically selected.

4. The method of claim 3, wherein each of the multiple backup caches are associated with different host systems.

5. The method of claim 1, wherein configuring the backup cache includes copying data write operations to the backup cache prior to acknowledging the data write operation to the cache consumer.

6. The method of claim 1, further comprising:
   detecting a failure of the backup cache; and
   automatically selecting an alternate backup cache, wherein the alternate backup cache is in a host system different from the host system that contains the selected cache resource.

7. The method of claim 6, wherein detecting a failure includes at least one of:
   detecting that a host system becomes ineligible due to maintenance requirements;
   failure of cache device;
   host agent not executing; and
   invalid network configuration.

8. The method of claim 6, further comprising:
   configuring the alternate backup cache; and
   copying data write operations to the alternate backup cache prior to acknowledging the data write operation to the cache consumer.

9. The method of claim 1, wherein presenting the user with an option to select a cache operating mode includes displaying the available host systems and the available backup caches.

10. The method of claim 1, wherein the selected backup cache is shared by multiple host systems simultaneously.

11. The method of claim 1, further comprising monitoring and detecting failure of a component associated with the selected cache resource and, responsive to detecting a failure, dynamically modifying a write policy associated with a plurality of affected cache consumers to protect the cached data.

12. An apparatus comprising:
   a plurality of host systems, wherein each of the plurality of host systems includes a cache and each of the plurality of host systems includes a plurality of virtual machines; and
   a management server coupled to the plurality of host systems, the management server configured to:
      identify a plurality of backup caches associated with the plurality of host systems;
      determine whether to reassign a particular backup cache from a first host system to a second host system based on the current balance of the plurality of backup caches among the plurality of host systems; and
      responsive to determining to reassign the particular backup cache to a second host system, the apparatus:
         selects a second host system to associate with the particular backup cache; and
         reassigns the particular backup cache with the second host system.

13. The apparatus of claim 12, wherein the management server is further configured to present a user with an option to select a cache operating mode for the cache.

14. The apparatus of claim 12, wherein each of the plurality of backup caches are associated with different host systems.

15. The apparatus of claim 12, wherein determining whether to reassign a particular backup cache is performed responsive to movement of a virtual machine between different host systems.

16. The apparatus of claim 12, wherein determining whether to reassign a particular backup cache is performed responsive to detecting a failure of at least one of the plurality of backup caches.

17. The apparatus of claim 12, wherein determining whether to reassign a particular backup cache is performed responsive to detecting that one of the plurality of host systems is ineligible due to maintenance reasons.

18. The apparatus of claim 12, wherein determining whether to reassign a particular backup cache is performed responsive to detecting an invalid network configuration.

19. The apparatus of claim 12, wherein determining whether to reassign a particular backup cache is performed responsive to detecting a non-executing host agent.

20. The apparatus of claim 12, wherein at least one of the plurality of backup caches is shared by multiple host systems simultaneously.

* * * * *